United States Patent
Adams et al.

(10) Patent No.: US 9,242,615 B2
(45) Date of Patent: *Jan. 26, 2016

(54) AUTOMATED VISION INSPECTION OF A SIDE CURTAIN AIRBAG ASSEMBLY

(71) Applicant: Honda Motor Co., Ltd., Tokyo (JP)

(72) Inventors: James Wesley Adams, Dublin, OH (US); Alec Peter Bacon, Upper Sandusky, OH (US)

(73) Assignee: Honda Motor Co., Ltd., Tokyo (JP)

( * ) Notice: Subject to any disclaimer, the term of this patent is extended or adjusted under 35 U.S.C. 154(b) by 150 days.

This patent is subject to a terminal disclaimer.

(21) Appl. No.: 14/046,142

(22) Filed: Oct. 4, 2013

(65) Prior Publication Data
US 2014/0099016 A1   Apr. 10, 2014

Related U.S. Application Data

(60) Provisional application No. 61/709,637, filed on Oct. 4, 2012.

(51) Int. Cl.
| | |
|---|---|
| *G06K 9/00* | (2006.01) |
| *B60R 21/20* | (2011.01) |
| *B60R 21/23* | (2006.01) |
| *G06T 7/00* | (2006.01) |

(Continued)

(52) U.S. Cl.
CPC ................ *B60R 21/20* (2013.01); *B60R 21/213* (2013.01); *B60R 21/23* (2013.01); *B60R 21/232* (2013.01); *G06T 7/001* (2013.01); *G06T 7/0004* (2013.01); *G06T 2207/30124* (2013.01); *G06T 2207/30208* (2013.01)

(58) Field of Classification Search
USPC ............ 382/141, 149, 152, 209, 278; 348/86, 348/92, 94
See application file for complete search history.

(56) References Cited

U.S. PATENT DOCUMENTS

| | | | |
|---|---|---|---|
| 6,560,520 B2 * | 5/2003 | Yokota | ................. B60N 2/2821 280/727 |
| 7,063,350 B2 | 6/2006 | Steimke et al. | |

(Continued)

FOREIGN PATENT DOCUMENTS

| | | |
|---|---|---|
| JP | 11321532 | 11/1999 |
| JP | 2004-098707 | 4/2004 |

(Continued)

OTHER PUBLICATIONS

Office Action of U.S. Appl. No. 14/046,038 dated May 26, 2015, 9 pages.

(Continued)

*Primary Examiner* — Yosef Kassa
(74) *Attorney, Agent, or Firm* — Rankin, Hill & Clark LLP

(57) ABSTRACT

An automated vision inspection system detects whether a cushion of a side curtain airbag assembly system is twisted. The cushion is provided a plurality of markings arrayed along a longitudinal extent of the cushion. Each marking can be defined by a group of four distinct characters or indicia. Each indicium can be defined by polygonal shaped pixels which allow the inspection system to find clear edges of the marking and thereby determine marking orientation. By determining orientation, the inspection system can compare the inspected marking to a master image of the marking to determine if the cushion is in a twisted state or non-twisted state.

15 Claims, 19 Drawing Sheets

(51) Int. Cl.
    *B60R 21/213*    (2011.01)
    *B60R 21/232*    (2011.01)

(56) References Cited

U.S. PATENT DOCUMENTS

| | | | |
|---|---|---|---|
| 7,147,245 B2 | 12/2006 | Florsheimer et al. | |
| 7,331,599 B2 * | 2/2008 | Laue | B60R 21/2037 280/728.2 |
| 7,568,727 B2 | 8/2009 | Ryan et al. | |
| 7,796,021 B2 * | 9/2010 | Saban | B60N 2/002 340/438 |
| 8,083,255 B2 | 12/2011 | Okimoto et al. | |
| 8,235,416 B2 * | 8/2012 | Breed | B60J 10/00 180/273 |
| 8,523,221 B2 | 9/2013 | Muller | |
| 8,818,638 B2 * | 8/2014 | Wellhoefer | B60R 21/013 701/45 |
| 8,820,782 B2 * | 9/2014 | Breed | B60J 10/00 180/273 |
| 2013/0113192 A1 | 5/2013 | Richards et al. | |
| 2013/0194471 A1 | 8/2013 | Yamashita | |

FOREIGN PATENT DOCUMENTS

| | | |
|---|---|---|
| JP | 2004-224255 | 8/2004 |
| JP | 2004-291724 | 10/2004 |
| JP | 2006-117112 | 5/2006 |
| JP | 2010-126078 | 6/2010 |

OTHER PUBLICATIONS

RD497048, Sep. 25, 2005, Anonymous.
Office Action of U.S. Appl. No. 14/046,038 dated Oct. 2, 2015, 15 pages.

\* cited by examiner

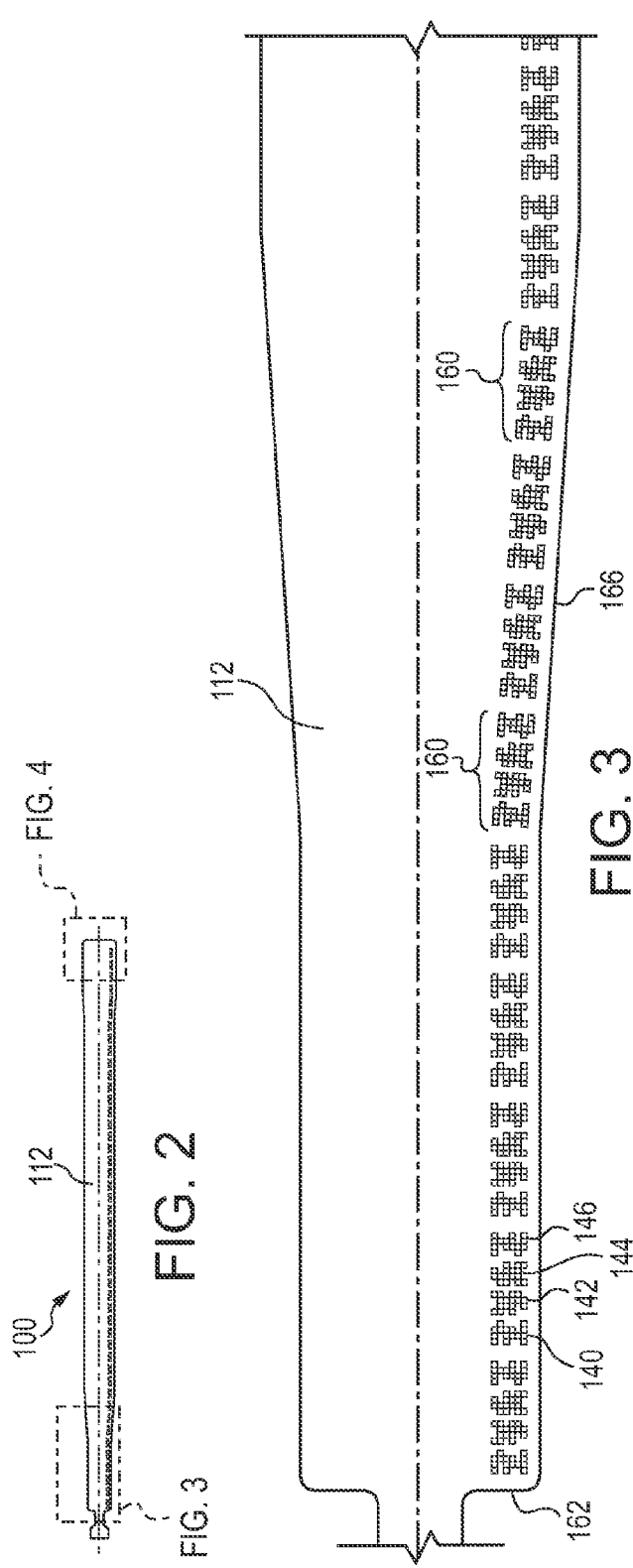
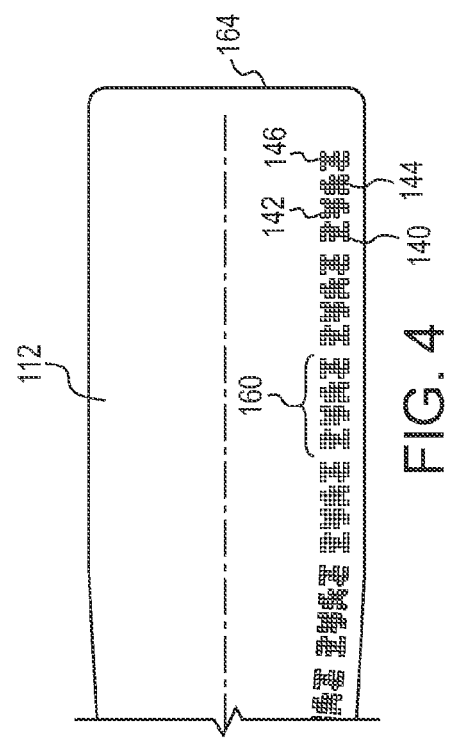

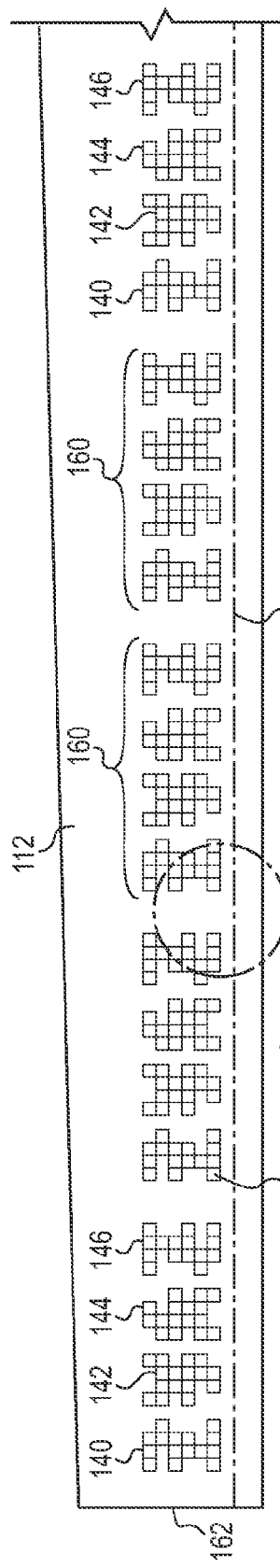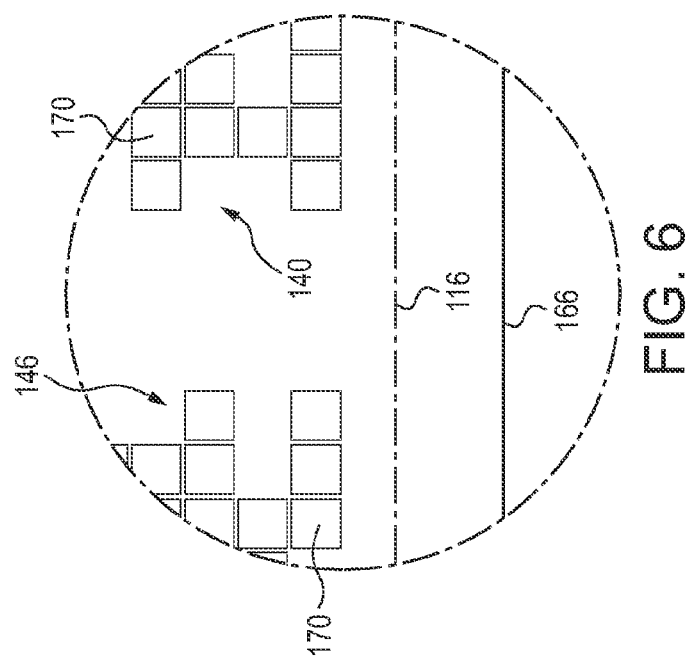

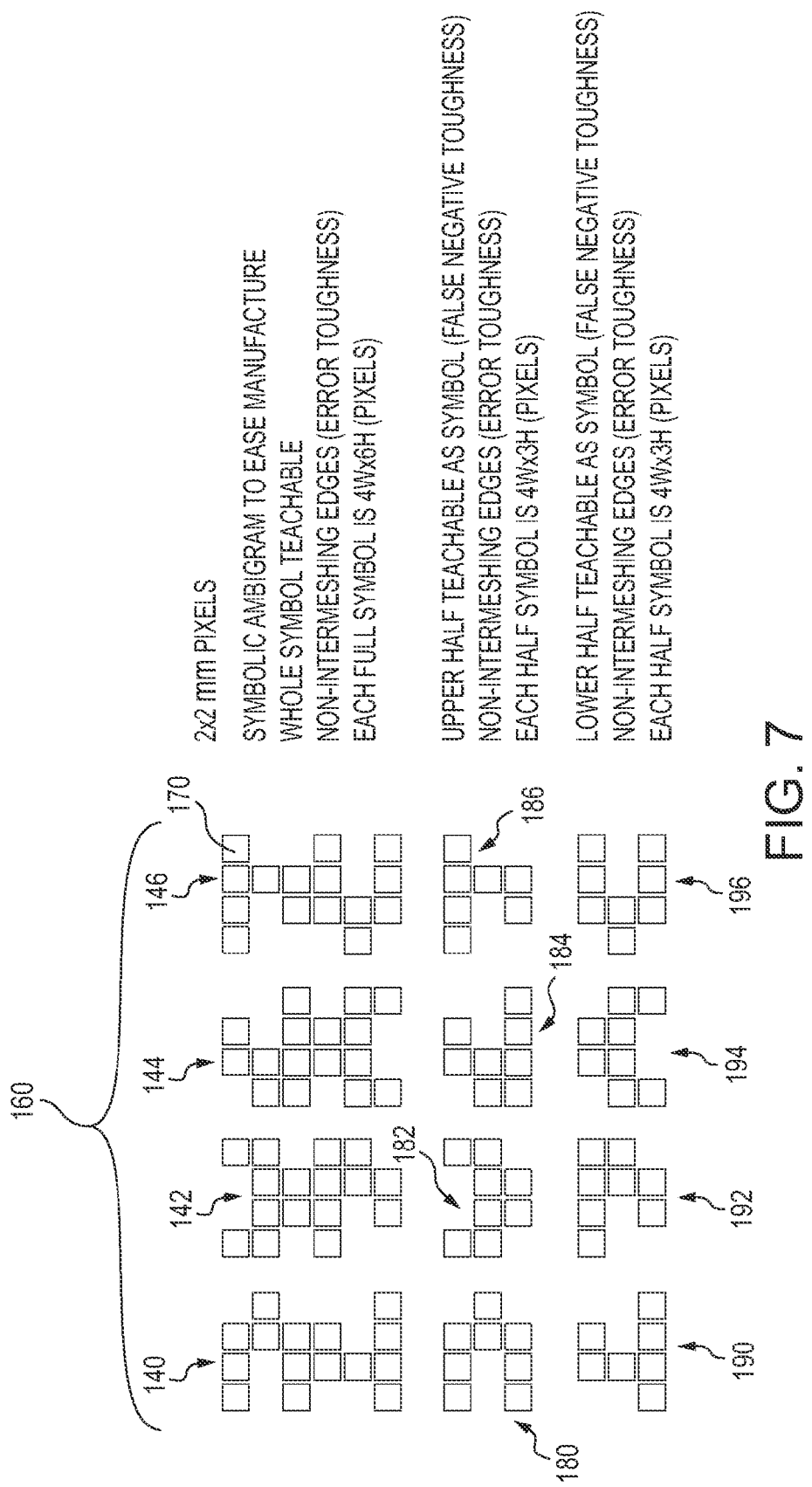

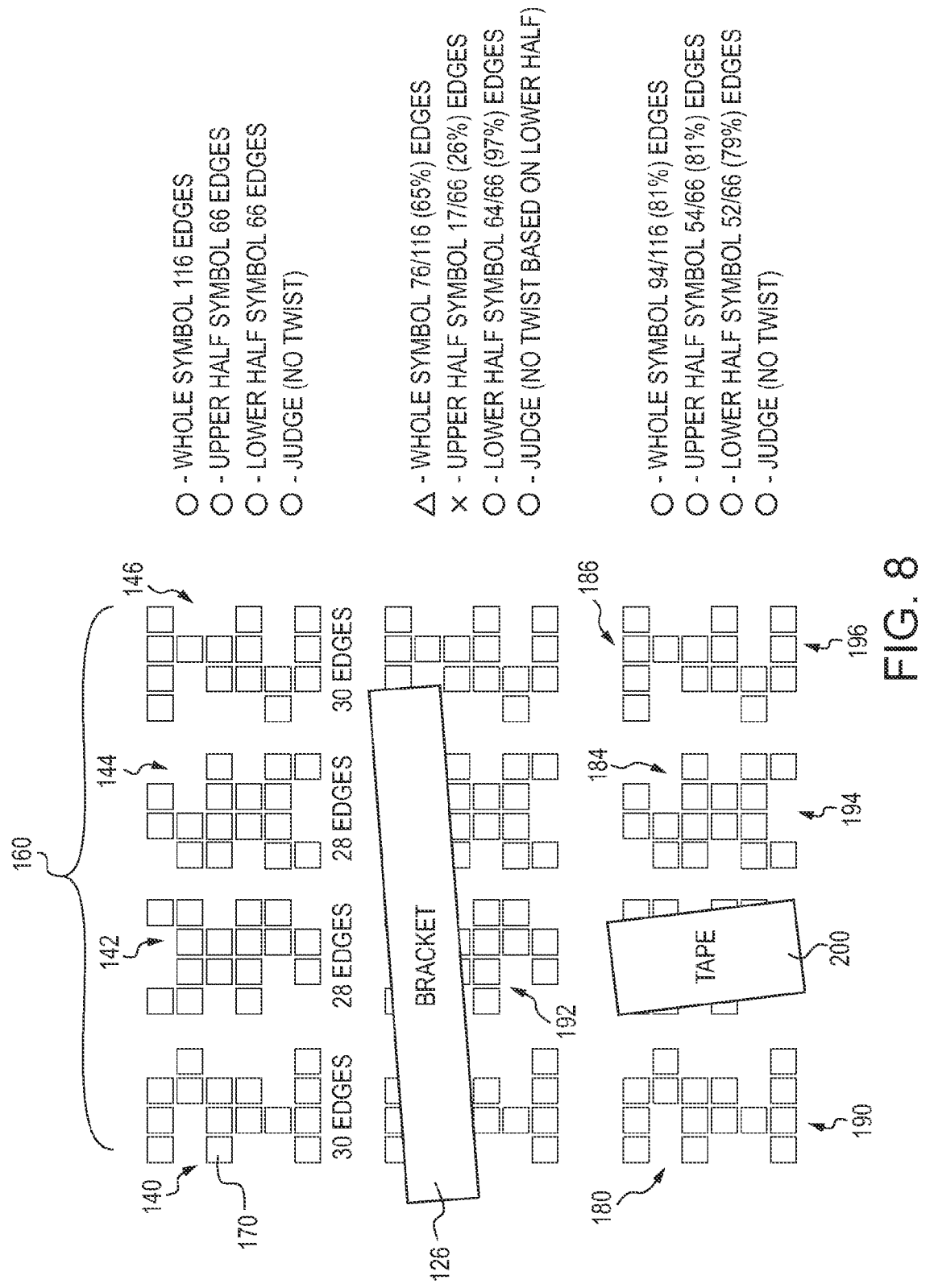

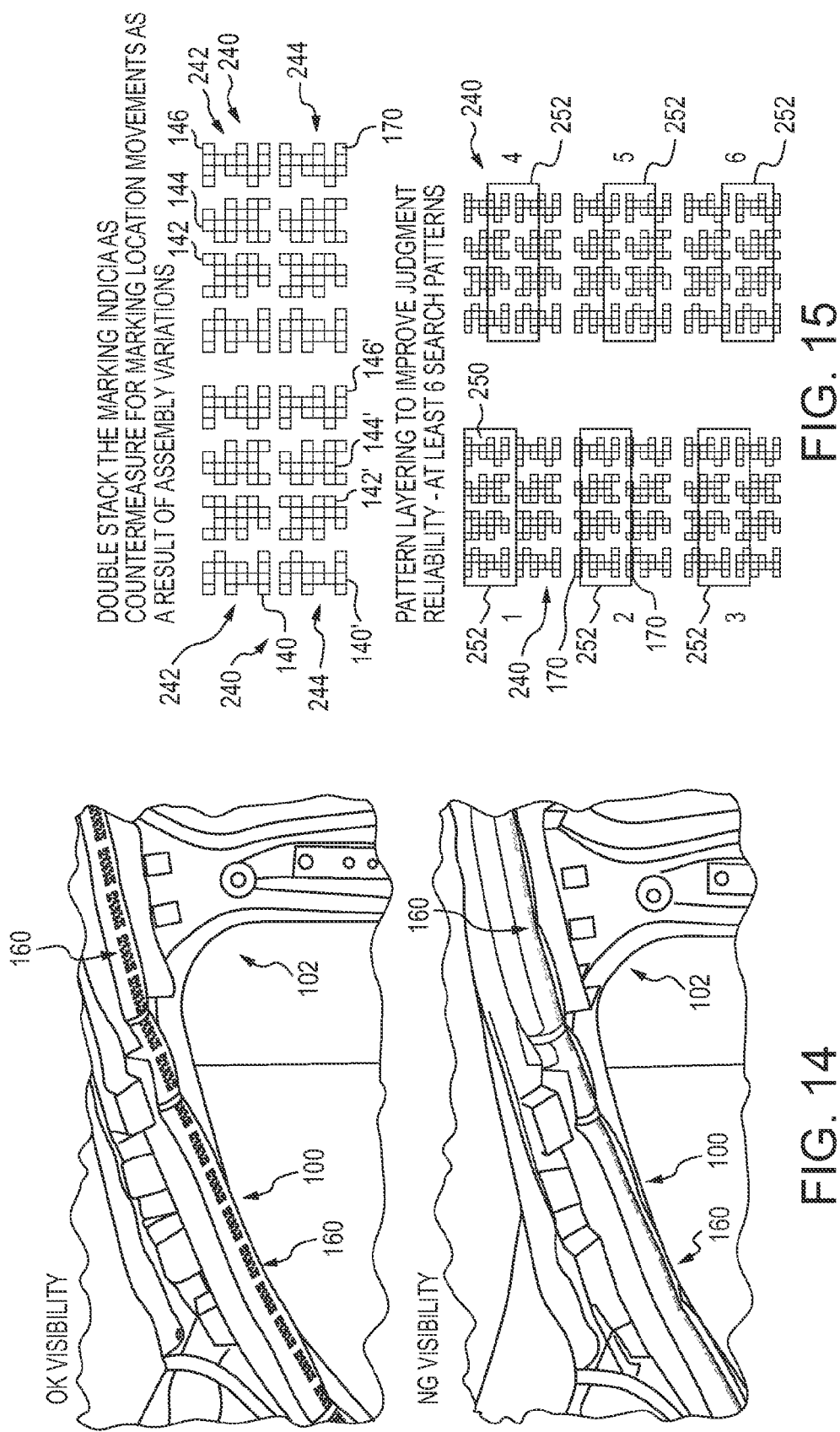

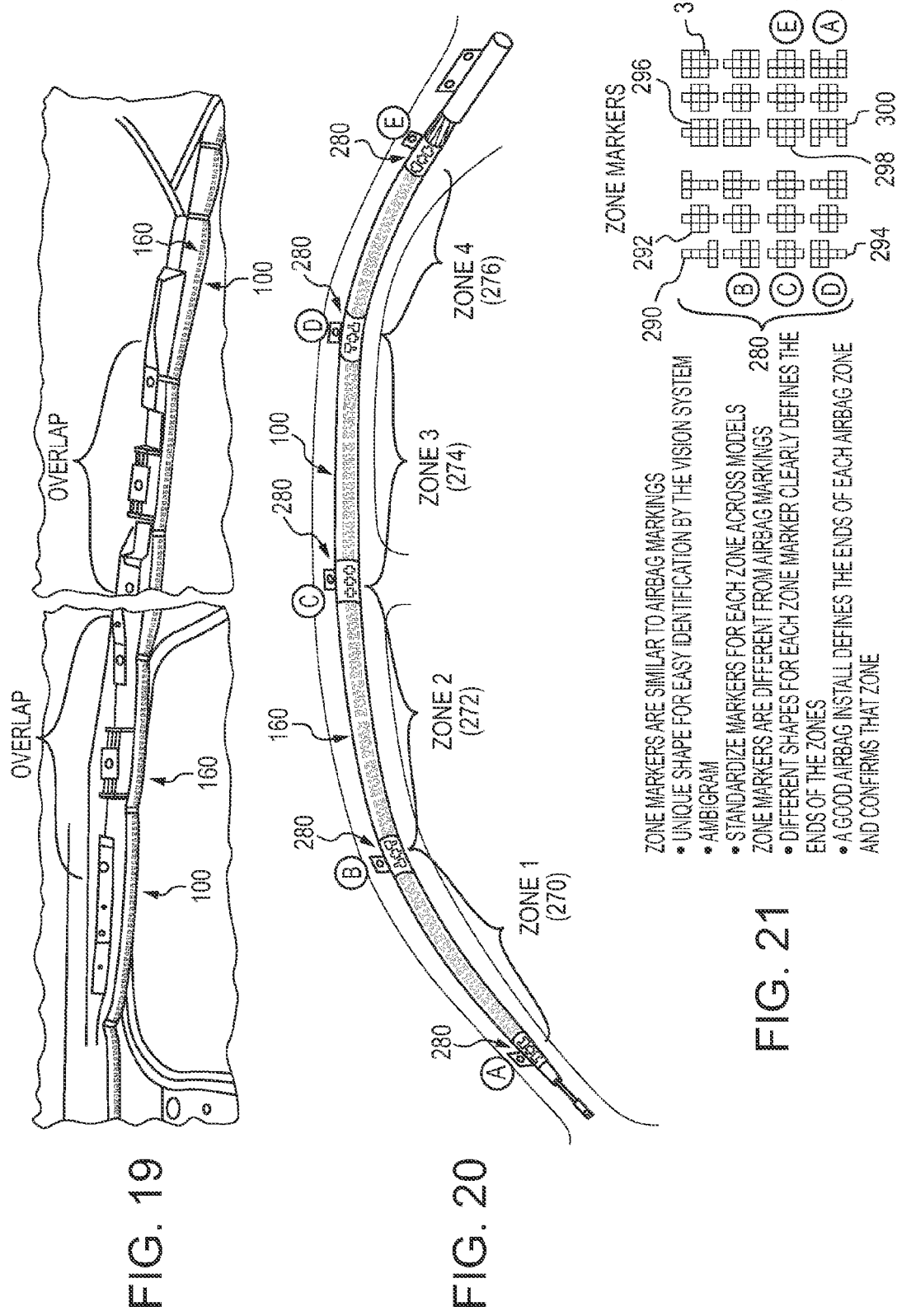

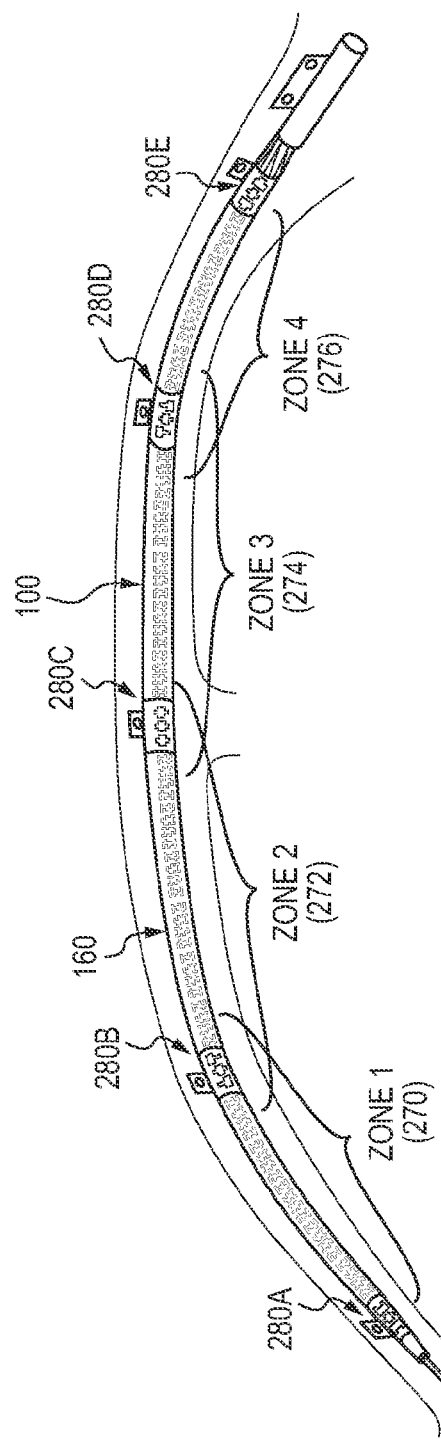
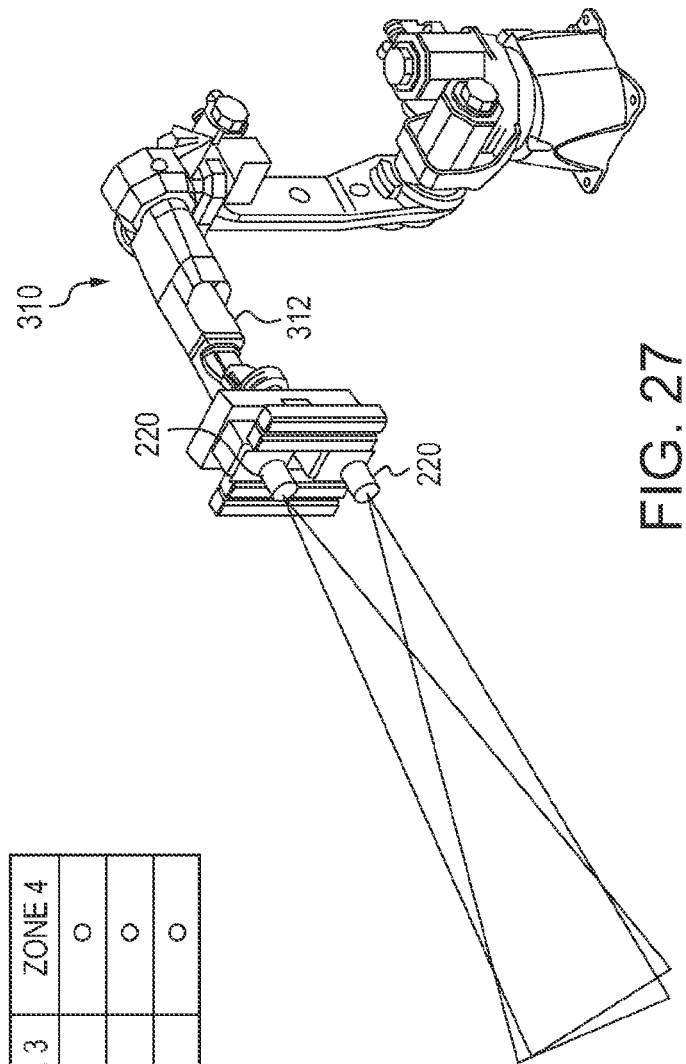
FIG. 26
FIG. 27

AUTOMATED VISION INSPECTION OF A SIDE CURTAIN AIRBAG ASSEMBLY

The present application claims priority to U.S. Provisional Patent Application Ser. No. 61/709,637, filed on Oct. 4, 2012, the disclosure of which is incorporated herein by reference.

BACKGROUND

Exemplary embodiments herein generally relate to a side curtain airbag, and more particularly, to an automated vision inspection of a side curtain airbag assembly for detecting whether a cushion of the side curtain airbag assembly is in a twisted state at the time of installation.

The side curtain airbag assembly is a safety device applied to passenger vehicles and is deployed by inflation with a pressurized gas to protect the occupants of the vehicle from a side impact head injury and to resist ejection from the vehicle in the case of a rollover. Generally, the side curtain airbag assembly includes a cushion, an inflator, mounting hardware and a variety of other hardware based on the requirements of the application. When the side curtain airbag assembly is manufactured, the cushion is rolled or folded to minimize the space occupied by the device in the vehicle. In some designs, the rolled or folded cushion is covered by a tubular sleeve of material which has a sewn seam or perforated line which ruptures when the inflation of the cushion begins. The side curtain airbag assembly is installed in a manner that the device begins generally at the base of the A-pillar (front), up the A-pillar, along the length of the roof, down the rear pillar (B, C or D pillar) and ends at the rear of the passenger compartment. In the simplest arrangement, the side curtain airbag assembly is long (two to four meters), slender (30 to 120 millimeters in circumference), and quite flexible (bend and twist). Due to this flexibility characteristic, installation must be done carefully to ensure the side curtain airbag assembly is not mounted to the vehicle with a 360 degree twist imparted to the longitudinal axis of the cushion. A twisted cushion may not deploy properly and thus may not provide the desired passenger safety protection.

To ensure proper installation, various vehicle manufacturers have applied markings to the cushion and/or sleeve to make a twisted installation more easily recognized with the human eye. Other manufacturers have employed hardware added to the side curtain airbag assembly to make imparting a 360 degree twist more difficult. In some cases, the additional hardware is extensive and thus adds weight and cost to the side curtain airbag assembly. Therefore, it is desirable to eliminate such weight and cost as long as other measures are taken to ensure a proper installation of the side curtain airbag. Automated vision inspection offers the possibility of such protection, but due to the flexible and compliant nature of the side curtain airbag assembly, the technology is prone to false detections. False detections are disruptive to manufacturing operations and thus resistance to application of vision inspection technology exists.

Automated vision inspection involves the capture of digital images of the installed side curtain airbag assembly and processing those images through imaging processing software that has been programmed to look for key features previously defined and to assess the installed condition by comparison of the current image to a master image. Due to the flexible and compliant nature of the side curtain airbag assembly, each installation is unique and thus, the master image would only give a satisfactory judgment when compared to itself. Therefore, for automated inspection, it is important to provide the image processing software with feature that can be easily detected within the digital images and evaluated for presence, position and orientation and subsequently used to determine the installed condition, twisted or not twisted, of the side curtain airbag assembly.

Traditional markings on the side curtain airbag assembly such as stripes, writing (in any language) or barcodes have been used to assist the human eye in detecting twists, but these marks fail to reliably prevent misinterpretation of features in the image when utilizing an automated vision inspection system. For example, in the case of a longitudinal stripe, the two dimensional appearance of the edge of the stripe can appear similar to the edge of the side curtain airbag against the vehicle body. Likewise, the shadow cast by the side curtain airbag can appear as a stripe. Also, the edge features of the vehicle, such as a door opening, can create a line that can be misinterpreted as a cushion stripe. Further, writing on the cushion of the side curtain airbag can create different possibilities of misinterpretation. For example, and as depicted in FIG. 28, consider a cushion with a series of letters or words printed on its entire length. A twisted installation of the cushion would create a gap in the words or letter string. However, if the words are arranged into a phrase, the natural gap between words can be misinterpreted as gaps created by a twisted installation. And, many Roman letters, such as the letter "S", have rounded sides. These rounded sides can make determining the bottom and side of the mark difficult and therefore determining orientation can be difficult. Still further, if a barcode is printed over the length of the side curtain airbag assembly and the vision system is programmed to read the barcode over the entire length, a bracket or tape required for the assembly may cover part of the barcode or a pucker may create an interruption to the barcode. Such a gap in the barcode could be misinterpreted by the vision system. For the application of a marking system to be effective in conjunction with the application of an automated vision inspection system, the marking system must be robust in order to ensure successful detection and interpretation by the automated vision inspection software. A robust marking system would have the characteristics of being easily detectible and unique within the images acquired while providing the information of position and orientation necessary to inspect the entire length of the side curtain airbag assembly and properly assess the state of the installed assembly. In addition, geometric shapes provided on a length of the side airbag cushion can have issues in interpretation. First, many of these geometric shapes appear in the vehicle in other locations. For example, round, triangular, rectangular and square holes are generally stamped into the vehicle body. Bolts with hexagonal heads, hexagonal pockets or round flanges are used during assembly. If the automated vision inspection system is looking for one of these geometric shapes, the vision system may lock onto a feature in the vehicle rather than the geometric mark on the airbag. Furthermore, as shown in FIG. 14, parallel edges of these shapes can be mistakenly used by the vision system to complete partial shapes. For example, if the right edge of the left hand triangle were missing due to a part covering it, the left edge of the right hand triangle could be used to complete the shape of the left hand triangle.

BRIEF DESCRIPTION

In accordance with one aspect, an automated vision inspection system is programmed to find and follow a series of unique markings along the longitudinal extent of the side curtain airbag assembly and thereby detects whether a cushion of a side curtain airbag assembly system is improperly installed or twisted. At least one of the cushion or a sleeve covering the cushion is provided a plurality of markings arrayed along a longitudinal extent of the same. Each marking can be defined by a group, e.g., four distinct characters or indicia. Each indicium can be defined by an arrangement of polygonal shaped pixels. The edges of one indicium do not match the edges of another indicium in a single marking. The automated vision inspection system locates the marking by comparing the image of the marking to the master image. The inspection system can determine a match percentage of the pixels defining the edge of the inspected indicia or of the pixels within the area inscribed by the edges of the inspected indicia as compared to the same pixels of the master image. Once the marking is located, the automated vision system is able to determine the position and orientation of the marking. By determining position and orientation, the automated vision inspection system can be programmed to estimate the location of the next occurrence of the marking. The search is repeated in the estimated location and if a marking is found, the position and orientation of that marking used to estimate the location of the next marking. By repeating this process, the markings can be located along the longitudinal extent of the side curtain airbag assembly. Further, the upper portion and the lower portion of each marking can define a unique separate marking. This allows for confirmation if a portion of the marking is covered or rotated out of view. The repetitive markings also allows for subsequent confirmation. By providing markings having a small width, a high quantity of repeat markings allows the inspection system to also measure the distance between adjacent markings and count marking occurrences. Provided the distance between adjacent occurrences of the markings does not exceed a predetermined threshold distance, the side curtain airbag can be judged to be installed properly. If the distance between adjacent markings occurrences exceeds a predetermined threshold distance, the installation can be judged to be installed improperly. The marking can also be a symbolic ambigram (appears the same if flipped 180°, which allows for simplified manufacturing by reducing the need to control orientation.

In accordance with another aspect, an automated vision inspection system for detecting whether a cushion of a side curtain airbag assembly system is in a properly installed or twisted state comprises a plurality of markings arrayed along a longitudinal extent of one of a cushion or a sleeve covering the cushion of a side cushion airbag assembly. Each marking is defined by a pair of stacked indicia. Each indicium of the pair of stacked indicia is defined by a plurality of polygonal shaped pixels. A detector is configured to capture digital images of the plurality of markings. A controller is configured to process the digital images captured by the detector and to determine presence of the indicia of the plurality of markings to assess an installed condition of the cushion or sleeve by comparison of the digital images to master images.

In accordance with yet another aspect, a vehicle part for installation on a vehicle body comprises a part body including a plurality of spaced markings arrayed along a longitudinal extent of the part body. Each marking is defined by a first upper row of indicia and a second lower row of indicia. Each of indicium of the first row of indicia is uniquely shaped compared to a shape of the other indicia provided in the first row of indicia. The first row and second row of indicia are formed from a plurality of similarly shaped and sized interconnected pixels. The plurality of markings allows for determination of an installed state of the vehicle part.

In accordance with still yet another aspect, a method of accessing an installed condition of a vehicle part on a vehicle body is provided. The method comprises providing a vehicle part having a plurality of spaced marking along a length the vehicle part; defining each marking by a first upper row of indicia and a second lower row of indicia, each indicium of the first row of indicia and the second row of indicia being formed from a plurality of similarly shaped and sized interconnected pixels; capturing images with a detector of the plurality of markings; and comparing the captured images of the plurality of marking with master images with a controller in communication with the detector to determine presence of the plurality of markings along the length of the vehicle part.

In accordance with still yet another aspect, a part for installation on an associated body comprises a part body including a plurality of spaced markings arrayed along a longitudinal extent of the part body. Each marking is defined by at least two indicia including a first indicium and a second indicium. The first indicium is uniquely shaped compared to a shape of the second indicium. Each of the first indicium and second indicium is formed from a plurality of similarly shaped and sized interconnected polygonal shaped pixels. The plurality of markings allow for determination of an installed state of the part.

BRIEF DESCRIPTION OF THE DRAWINGS

FIG. 2 is a view of an open sleeve which covers a cushion of the side curtain airbag assembly of FIG. 1. This material of the sleeve is folded and sewn along the mating edge to create a tubular sleeve that is pulled over the rolled or folded cushion to retain the shape of the cushion. The flat sleeve material can also be wrapped around the cushion and sewn closed or closed with fasteners or tape. A plurality of marking according to one aspect of the present disclosure is arrayed along a length of the sleeve.

FIG. 3 is an enlarged side view of a front or forward end portion of the sleeve of FIG. 2.

FIG. 4 is an enlarged side view of a rear end portion of the sleeve of FIG. 2.

FIG. 5 is an enlarged view of the folded and sewn sleeve front end portion of FIG. 3.

FIG. 6 is an enlarged view of a section of the sleeve of FIG. 5.

FIGS. 7 and 8 further depict a group of indicia of FIG. 5 including exemplary characteristics of the indicia.

FIG. 14 shows a section of an installed side curtain airbag assembly having adequate visibility of the plurality of markings of FIGS. 2-5 and poor visibility of the plurality of markings of FIGS. 2-5.

FIG. 15 depicts a plurality of markings for a side curtain airbag assembly according to another aspect of the present disclosure. Further depicted is a plurality of patterns for detection provided by each marking.

FIGS. 19 and 20 depict another operation of the exemplary automated vision inspection system of FIG. 11 for detecting the of FIGS. 2-5 or FIGS. 15 and 17 provided on the side curtain airbag assembly and determining the installed state of the side curtain airbag assembly.

FIG. 21 illustrates exemplary zone markers for use in separating the side curtain airbag assembly into at least two zones as shown in FIG. 20.

FIG. 26 depicts the separate zones of the side curtain airbag assembly.

FIG. 27 depicts an exemplary robot for use with the automated vision inspection system of FIG. 11.

DETAILED DESCRIPTION

It should, of course, be understood that the description and drawings herein are merely illustrative and that various modifications and changes can be made in the structures disclosed without departing from the present disclosure. It should be appreciated that the term "plurality" means "two or more", unless expressly specified otherwise. It will also be appreciated that the various identified components of the side curtain airbag assembly disclosed herein are merely terms of art that may vary from one manufacturer to another and should not be deemed to limit the present disclosure.

The present disclosure generally relates to an automated vision inspection system and related method for detecting whether a vehicle part is properly installed on a vehicle body. For ease of understanding of the present disclosure, the vehicle part is a side curtain airbag assembly system; although, it should be appreciated that the vehicle part is not limited to a side curtain airbag assembly and that the system and related method of the present disclosure is applicable to other vehicle parts to be installed on the vehicle body.

Figure 1:
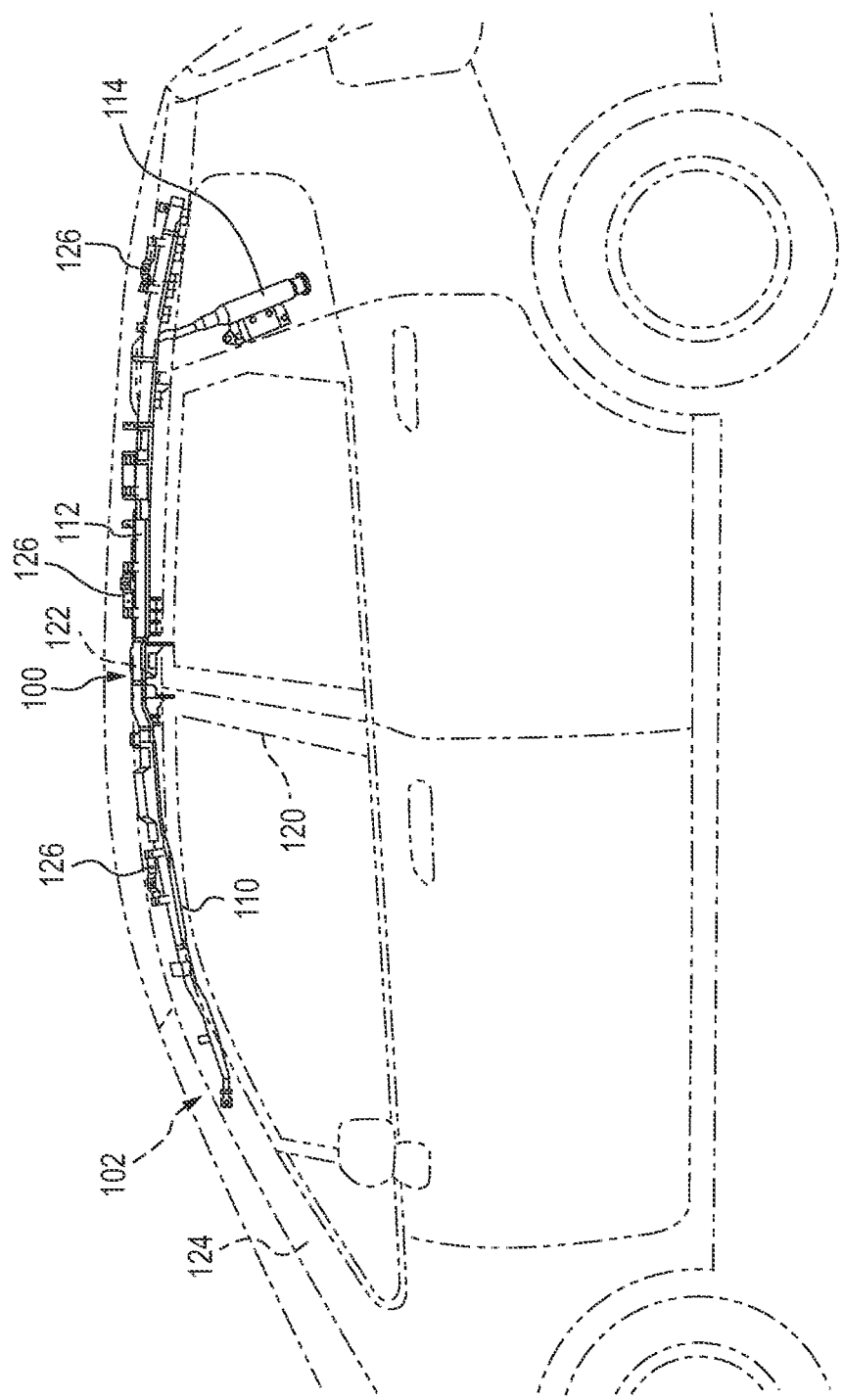
FIG. 1 is a side view of a side curtain airbag assembly showing the side curtain airbag assembly disposed on a right side of the vehicle, which is seen from a left side of the vehicle.

Referring now to the drawings, wherein like numerals refer to like parts throughout the several views, FIG. 1 schematically illustrates a vehicle part or side curtain airbag assembly 100 disposed on a right side of a vehicle 102. Herein, when a direction is described, the direction is based on a direction defined by front and rear sides of the vehicle and right and left sides of the vehicle as viewed from the driver's seat of the vehicle. It should be appreciated that a corresponding side curtain airbag assembly is provided on a left side of the vehicle 102. Therefore, only on the side curtain airbag assembly 100 on the right side of the vehicle 102 will be described, and the description of the side curtain airbag assembly on the left side of the vehicle will be omitted since each side curtain airbag assembly has the identical structure.

As shown in FIG. 1, the side curtain airbag assembly 100 includes a cushion 110, a sleeve or cover 112 for housing the cushion in a folded state, an inflator 114, mounting hardware and a variety of other hardware based on the requirements of the application. The cushion 110 of the side curtain airbag assembly 100 is deployed to protect the occupants of the vehicle 102 from a side impact head injury and to resist ejection from the vehicle 102 in the case of a rollover. The inflator 114 expands the cushion 110, and in doing so, ruptures the sewn seam, perforated line 116 (FIG. 5) or other means of closure in the sleeve 112, and the cushion inflates and expands from an upper portion to a lower portion of the window openings 120 along the vehicle interior side of the window openings at the time of a vehicle collision. The side curtain airbag assembly 100 is disposed at the upper portion of the window openings 120 of the vehicle 102, extending from the front side to the rear side of the vehicle. Specifically, the side curtain airbag assembly 100 is provided along a roof side rail 122 extending from and covering a front pillar or A-pillar 124 in the vehicle interior of the vehicle 102. The side curtain airbag assembly 100 can be fixed onto the vehicle via a plurality of brackets 126 provided with the upper portions of the cover 112.

With reference now to FIGS. 2-6, at least one of the cushion 110 and the sleeve 112 of the side curtain airbag assembly 100 is provided with a plurality of exemplary characters or indicia 140, 142, 144, 146 designed to improve the accuracy of the automated inspection of the side curtain airbag assembly. In the depicted embodiment, the indicia are provided on the sleeve 112; although, it should be appreciated that the indicia can be provided on the cushion 110. The indicia 140, 142, 144, 146 give a visible marking for the human eye, but also enable an automated vision inspection system 150 (see FIG. 11) to quickly determine the state of the installed cushion 110 of the side curtain airbag assembly 100. In order words, with the exemplary indicia, a cushion in a twisted state is easily detectible and false detections are minimized. As shown, the indicia 140, 142, 144, 146 are grouped together to define a single word or marking 160 which is arrayed in a repeating manner along a longitudinal direction of the sleeve 112. The array of markings 160 is spaced a predetermined distance from a forward end 162 and rearward end 164 of the sleeve 112, and also from a lower edge 166 of the sleeve in a flattened state. According to one aspect of the present disclosure, the indicium 140 of the foremost marking 160 is spaced less than 10 mm from the forward end 162, for example about 6 mm from the forward end, and the indicium 146 of the rearmost marking is spaced about 28 mm from the rearward end 164. Further, the distance from the lower edge 166 of the sleeve 112 to the lower edge of the array of markings 160 can vary to insure visibility depending on the location of the sleeve 112 relative to the vehicle body and the tolerances associated with the fabrication of the cushion 110 or sleeve 112. For example, the distance from the lower edge 166 to the array of markings 160 can range from about 4.5 mm to about 6.5 mm depending on the location of the sleeve 112 relative to the vehicle body and the tolerances associated with the fabrication of the cushion 110 or sleeve 112. For example, the distance between the markings 160 and the lower edge 166 near the A-pillar 124 can be smaller than the distance between the markings 160 and the lower edge 166 near one of the remaining pillars. More particularly, according to another aspect of the present disclosure, the markings 160 provided on the exemplary sleeve 112 near the A-pillar 124 can be spaced about 4.5 mm from the lower edge 166 and this spacing can gradually increase to about 6.5 mm for markings 160 provided rearward of the A-pillar 124. Furthermore, adjacent markings 160 may be spaced a predetermined distance apart, and according to one embodiment, this spacing between adjacent markings 160 is about 6 mm (see FIG. 7). It should be appreciated that providing of a slightly larger space between marking groups than that between individual markings facilitates ease of automated vision programming.

As shown in FIGS. 5 and 6, each indicium of the indicia 140, 142, 144, 146 can be formed from a plurality of similarly shaped and sized interconnected pixels 170 which together provide for indicium having a predetermined height and width, and a predetermined spacing between adjacent indicium of each marking 160. Particularly, and according to one aspect, each pixel can be a 2 mm by 2 mm square, with the height of each indicium 140, 142, 144, 146 of about 12 mm (i.e., 6 2×2 mm pixels), a width of each indicium 140, 142, 144, 146 of about 8 mm (i.e., 4 2×2 mm pixels), and the spacing between adjacent indicium of each marking 160 of about 2 mm. Thus, the pixels 170 of each indicium 140, 142, 144, 146 generally define a table having 4 columns and 6 rows, with certain of the cells (i.e., pixels 170) active (i.e., marked or colored) and certain of the cells inactive (i.e., clear or non-colored) to define a unique shape for that indicium. More particularly, the table below illustrates the basic outline for the indicia, with each cell of the table defining one of the pixels 170 that collectively form that indicium. For example, indicium 140 has cells D-1, A-2, B-2, D-3, A-4, D-4, A-5, C-5, and D-5 inactive with the remaining cells active. Indicium 142 has cells B-1, C-1, A-3, D-3, A-5, B-5, A-6 and D-6 inactive with the remaining cells active. Indicium 144 is identical to indicium 142 rotated 180 degrees. Similarly, indicium 146 is identical to indicium 140 rotated 180 degrees.

| A-1 | B-1 | C-1 | D-1 |
| A-2 | B-2 | C-2 | D-2 |
| A-3 | B-3 | C-3 | D-3 |
| A-4 | B-4 | C-4 | D-4 |
| A-5 | B-5 | C-5 | D-5 |
| A-6 | B-6 | C-6 | D-6 |

It should be appreciated that the present disclosure is not limited to the depicted square shaped pixels and that alternative polygonal shapes and sizes for the pixels 170 are contemplated. For example, the pixels 170 can be pentagon or octagon shaped, with that shape being defined by one of the cells in the table above. Also, it should be appreciated that combinations of polygons (i.e., square and pentagon) can be used as the shapes of the pixels that define each indicium 140, 142, 144, 146.

Figure 11:
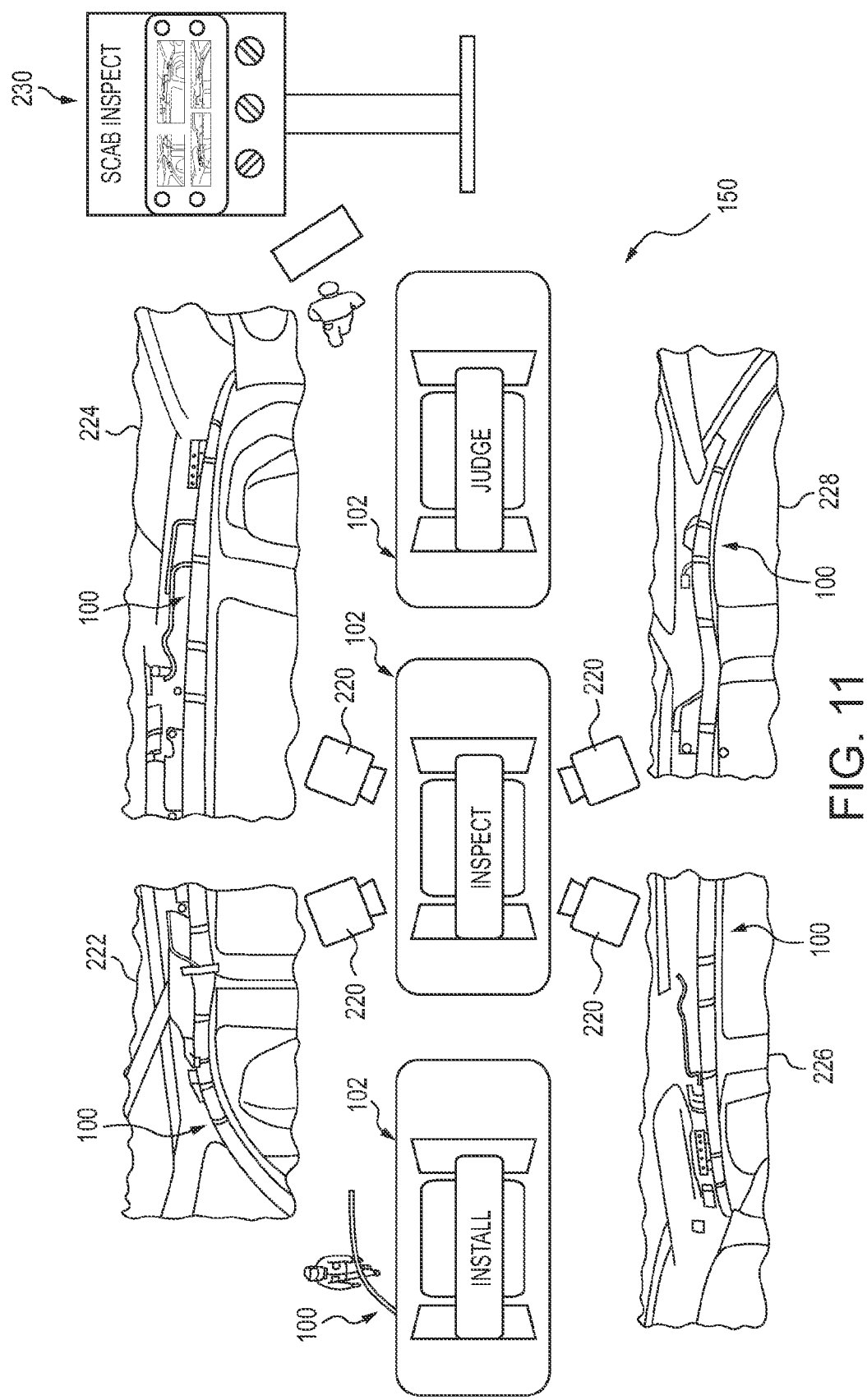
FIG. 11 shows the installation and automated inspection of the side curtain airbag assembly of FIG. 1 according to one aspect of the present disclosure.

Thus, the exemplary configuration of each indicium 140, 142, 144, 146 provides for a marking 160 that is a symbolic ambigram for ease of manufacture of the sleeve 112. Further, each indicium as a whole can be a teachable symbol for the automated vision inspection system 150 (FIG. 11). And the pixels 170 of each indicium define non-intermeshing edges that can be detected by the inspection system 150 to reduce error during the automated inspection of the cushion 110. For example, and with the exemplary configurations shown in FIG. 8, indicium 140 has thirty (30) exterior edges, indicium 142 has twenty-eight (28) exterior edges, indicium 144 has twenty-eight (28) exterior edges and indicium 146 has thirty (30) exterior edges, for a total of one hundred sixteen (116) exterior edges for each marking 160. Each exterior edge segment is broken into individual pixels in the digital image and comparisons of these pixels between the master image and inspected image is completed by the inspection system 150. Thus, detection of a predetermined percentage of the pixels for each of the one hundred sixteen (116) edges for one of the markings 160 by the inspection system 150 is indicative of a non-twist state for a portion of the cushion 110 associated with that detected marking.

Figure 10:
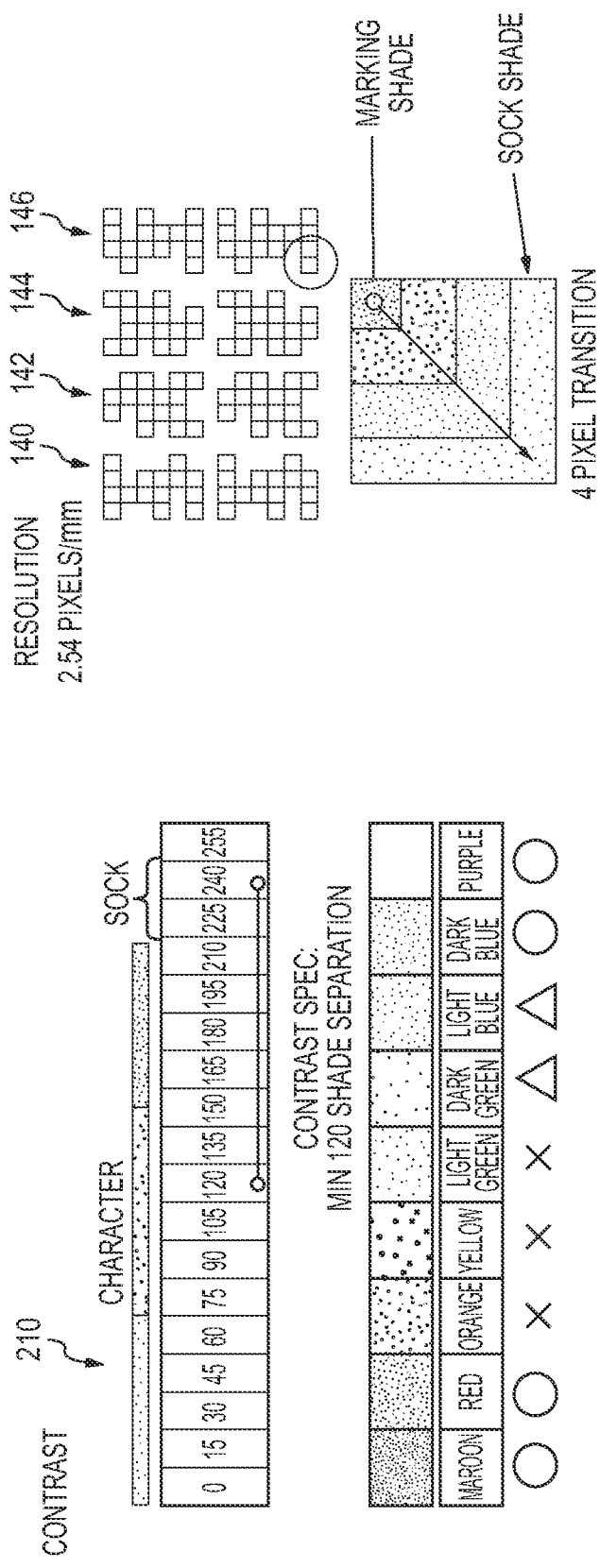
FIG. 10 shows the pixel contrast transition between the sleeve material of FIG. 2 and the groups of indicia provided thereon.

Additionally, the indicia 140, 142, 144, 146 of each marking 160 can be separated (for detection purposes) into respective upper portions 180, 182, 184, 186 and respective lower portions 190, 192, 194, 196. In the depicted embodiment, each upper portion and lower portion has a height of about 6 mm (i.e., 3, 2×2 mm pixels) and a width of about 8 mm (i.e., 4 2×2 mm pixels), and can be a teachable symbol for the automated vision inspection system 150. The pixels 170 for each upper and lower portion can also define non-intermeshing edges that can reduce error during the automated inspection of the installed side curtain airbag assembly 100. For example, as shown in FIG. 10, each upper portion 180, 182, 184, 186 and each lower portion 190, 192, 194, 196 of the respective indicia 140, 142, 144, 146 has sixty-six (66) exterior edges. Thus, detection of a predetermined percentage of the pixilated sixty-six (66) exterior upper edges or a predetermined percentage of the pixilated sixty-six (66) lower exterior edges for a marking 160 by the inspection system 150 is also indicative of a non-twist state for the portion of the cushion 110 or sleeve 112 associated with the detected marking.

Figure 9:
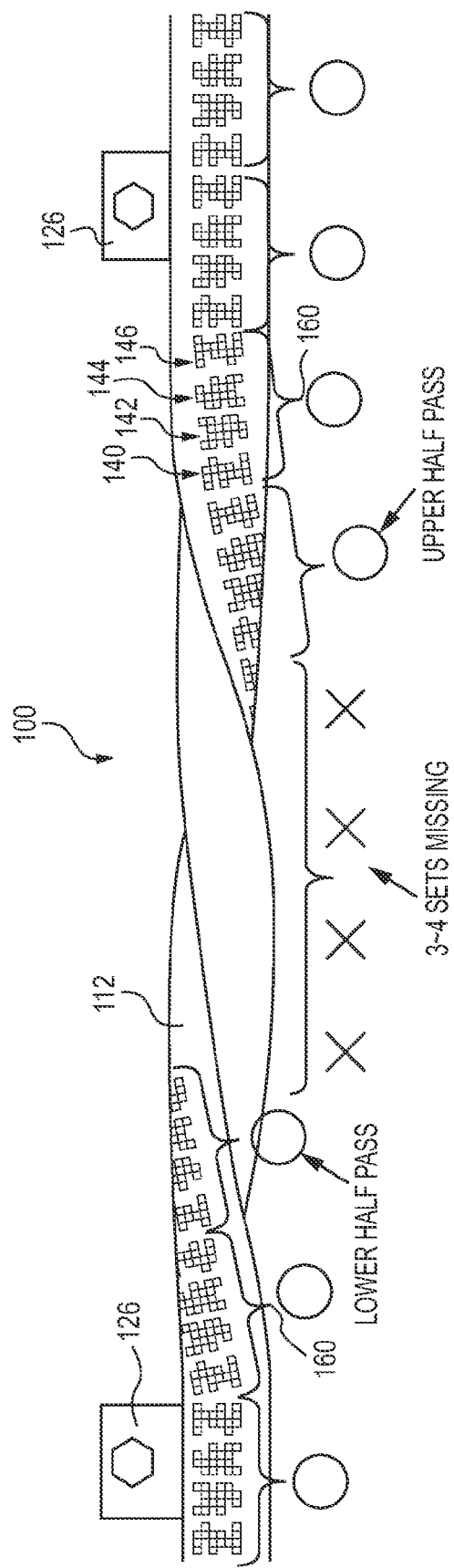
FIG. 9 schematically depicts in a twisted state a section of the side curtain airbag assembly of FIG. 1, which utilizes the printed sleeve depicted in FIG. 5.

As indicated above, by having the indicia 140, 142, 144, 146 as a whole including the upper portions and lower portions as separate teachable symbols, and with the designation of the edges of the pixels 170 as one of the manners for recognizing the separate teachable symbols, errors in detecting a twisted state of the cushion 110 can be reduced. For example, in the case of a bracket 126 located at least partially over one of the markings 160, several edges of the pixels 170 of that marking 160 are covered, which can cause the inspection system 150, when viewing each of the indicium 140, 142, 144, 146 as a whole, to flag that portion of the cushion 110 or sleeve 112 associated with that partially covered marking as possibly being in a twisted state. However, because the inspection system 150 also detects the exterior of pixel edges of each of the upper portions 180, 182, 184, 186 (which in this example would be significantly covered by the bracket 126 and be judged as a twisted state) and the exterior pixel edges of each of the lower portions 190, 192, 194, 196 (which in this example would not be covered by the bracket 126 and be judged as a non-twist state), the portion of the cushion 110 or sleeve 112 associated with the partially covered marking 160 depicted in FIG. 8 will be judged to be in the non-twist state. In the case of a piece of tape 200 covering the indicium 142, when viewing each of the indicium 140, 142, 144, 146 as a whole, a majority of the exterior pixel edges of the marking 160 are detected by the inspection system 150. Further, a majority of the exterior pixel edges of the upper portions 180, 184, 186 and the lower portions 190, 194, 196 are also detected by the inspection system 150. Therefore, the portion of the cushion 110 or sleeve 112 associated with the taped marking 160 depicted in FIG. 8 will be judged in the non-twist state. FIG. 9 depicts the sleeve 112 with certain portions of the sleeve being in a non-twist state and certain portions of the sleeve being in a twist state as determined by the detection of the markings 160 described above.

The automated vision inspection system 150 (see FIG. 13) can be programmed to find the first occurrence of the marking 160 on one end of the cushion 110 or sleeve 112 of the side cushion airbag assembly 100 and use the orientation of that occurrence to predict the position of the next occurrence of the marking 160 and proceed accordingly to the other end of installed side cushion airbag assembly 100. Once programmed the inspection system 150 looks for a full marking, an upper half and a lower half and renders a judgment of a non-twist state (presence) or a twisted state (missing) for each occurrence (FIG. 8). The inspection system 150 can mark a center point of a marking 160 and the distance between each marking 160 can be measured by counting pixels in the digital image. As long as the distance, measured in pixels, between markings 160 is within a prescribed distance, a marking is judged as "pass". If the distance between occurrences of the markings 160 exceeds a prescribed limit, the judgment is "fail". In the illustration of FIG. 9, the side cushion airbag assembly 100 in a twisted state results in several occurrences of the makings 160 to not be visible to the inspection system 150. As a result, the distance limit between occurrences is exceeded and the side cushion airbag assembly 100 fails inspection.

It should be appreciated that when a portion of the cushion 110 or sleeve 112 of the side cushion airbag assembly 100 is twisted, several adjacent occurrences of indicia groups or markings 160 become not visible to the inspection system 150. Not visible can mean a 0% detection of the indicia of the marking 160, which includes the individual indicium, the upper portion of each indicium and the lower portion of each indicium. Thus, if the inspection system 150 can detect a predetermined percentage of the marking 160, the side cushion airbag assembly is judged to be not twisted. For example, if the inspection system 150 detects 50% of the marking 160, the cushion 110 or sleeve 112 is judged to be not twisted because 50% detection could mean that the marking 160 is covered by a bracket, covered by tape or that portion of the cushion or sleeve associated with the 50% detected marking is starting to twist. However, if that portion of the cushion 110 or sleeve 112 is starting to twist, the next or adjacent marking 160 will also have a much lower percent match or no percent match at all. Therefore, the inspection system 150 is adapted to judge adjacent missing markings 160 as a twisted state. Again, because the inspection system 150 is looking for a condition of a missing marking 160, a low threshold percentage on the match of the markings can be set. For example, if the inspection system 150 detects only 50% of the lower portions of one of the markings, that would give a 25% match on the complete marking. Even though the inspection system 150 can only detect this small percentage of the marking as a whole, it can be enough to judge that the cushion 110 or sleeve 112 is not twisted. Thus, according to one aspect, to reduce errors in the inspection process, the inspection system 150 is looking for the absence of markings 160 to indicate that the cushion 110 or sleeve 112 of the side cushion airbag assembly 100 is twisted. In other words, the exemplary inspection system 150 is looking for the presence of some portion of the markings 160 to indicate that the cushion 110 or sleeve 112 is not twisted. Therefore, the inspection system 150 can allow for one of the markings 160 to disappear (i.e., a 0% match) because the cushion or sleeve cannot twist in that short of a distance (i.e., about 38 mm, the total width of each exemplary marking 160), and a twist will typically drop two or more adjacent markings 160.

With reference now to FIG. 10, printing of the indicia 140, 142, 144, 146 on the material of the sleeve 112 should have sufficient contrast and resolution to produce a clear pixel edge when viewed in grey scale. According to one aspect, contrast between the printed indicia 140, 142, 144, 146 and the material under white light should have a minimum separation of 120 shades of grey on a standard grey scale 210 having a range of 0 (black) to 255 (white). When determining the contrast separation, the average intensity of illumination should be such that the sleeve material produces a grey scale appearance between 220 and 240. The resolution of the printing of the indicia 140, 142, 144, 146 on the sleeve material should produce a pixel edge for each indicium that transitions from the printed indicium shade of grey to the unprinted material shade of grey within four (4) pixels when imaged with a machine vision camera where the resolution is about 2.54 pixels/mm under the prescribed illumination. The four (4) pixel transition refers to the number of pixels appearing in the captured image that are required to transition from the indicium shade of grey to the sleeve material shade of grey. Specifically, when examining the image and beginning from within the indicium shade of grey and moving toward the sleeve material shade of grey, the 1st pixel is the indicium shade of grey, the 2nd pixel is a lighter shade than the 1st, the 3rd pixel is a lighter shade than the 2nd and the 4th pixel is lighter than the 3rd and is the sleeve material grey scale shade which should have a shade between 220 and 240.

FIG. 11 depicts the exemplary automated vision inspection system 150 for detecting a twist in the side curtain airbag assembly 100. As shown, the side curtain airbag assemblies 100 are first installed in the vehicle 102. The installation of each side curtain airbag assembly 100 can be first judged by the human eye. Once installed, the human eye can follow the stripe-like appearance of the indicia running the length of the sleeve 112. Confirmation of proper installation is then made by the automated vision inspection system by processing images of the installation to automatically locate each occurrence of the four-indicium markings 160 and judge each one on completeness of appearance of the entire marking, the upper portions of the indicia and/or the lower portions of the indicia. Particularly, the vehicle is then moved to an inspection station where detectors 220, such as cameras, capture digital images 222, 224 and digital images 226, 228 of the respective left and right side curtain airbags. Because each side curtain airbag assembly 100 follows the contour of the vehicle 102 and the cushion 110 is flexible, each installation appears slightly different. Thus, the detectors 220 capture images of the side curtain airbag assembly along the length of the vehicle.

Figure 12:
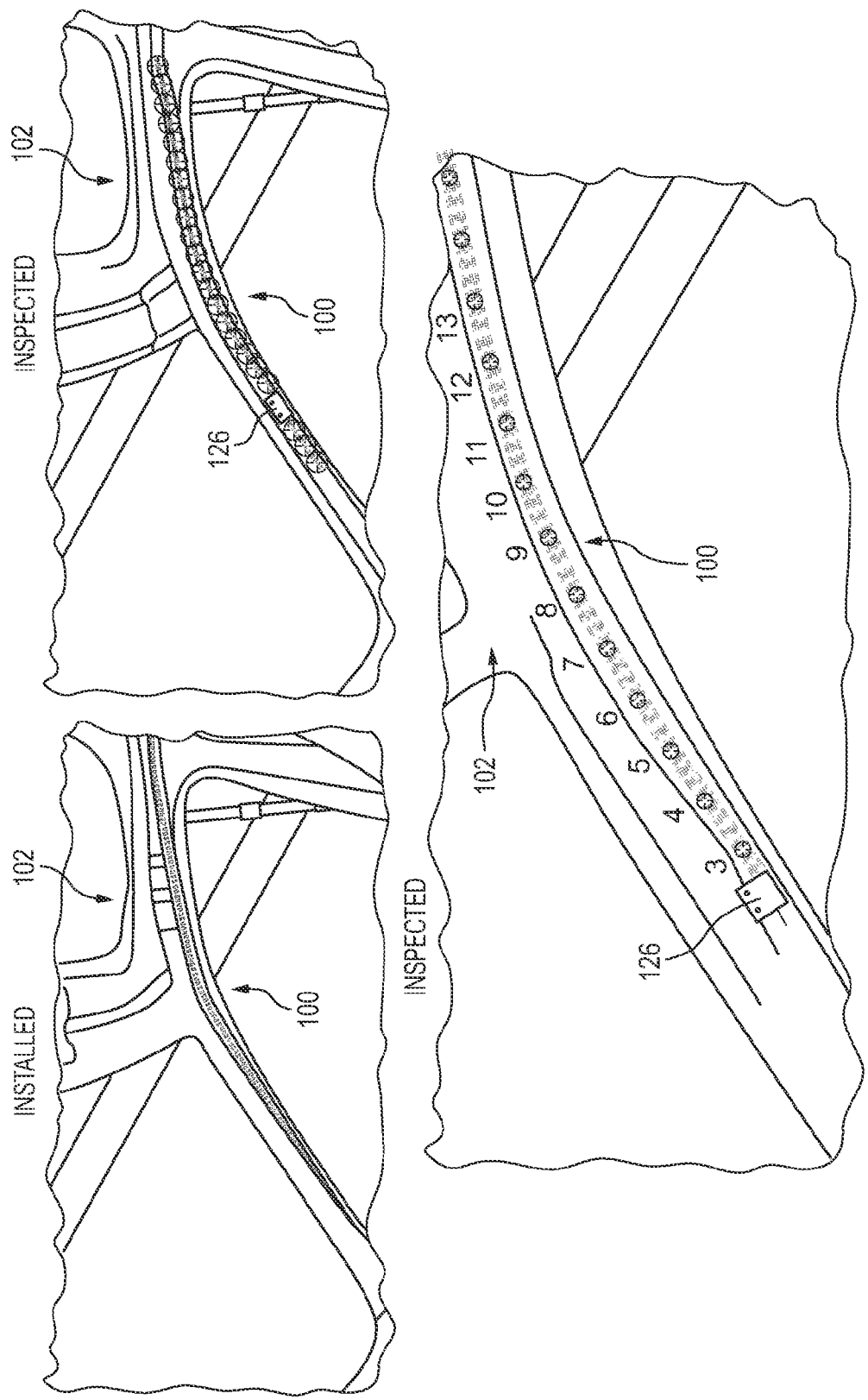
FIGS. 12 and 13 show the inspection and judgment of the side curtain airbag assembly by the exemplary automated vision inspection system of FIG. 11.
Figure 13:
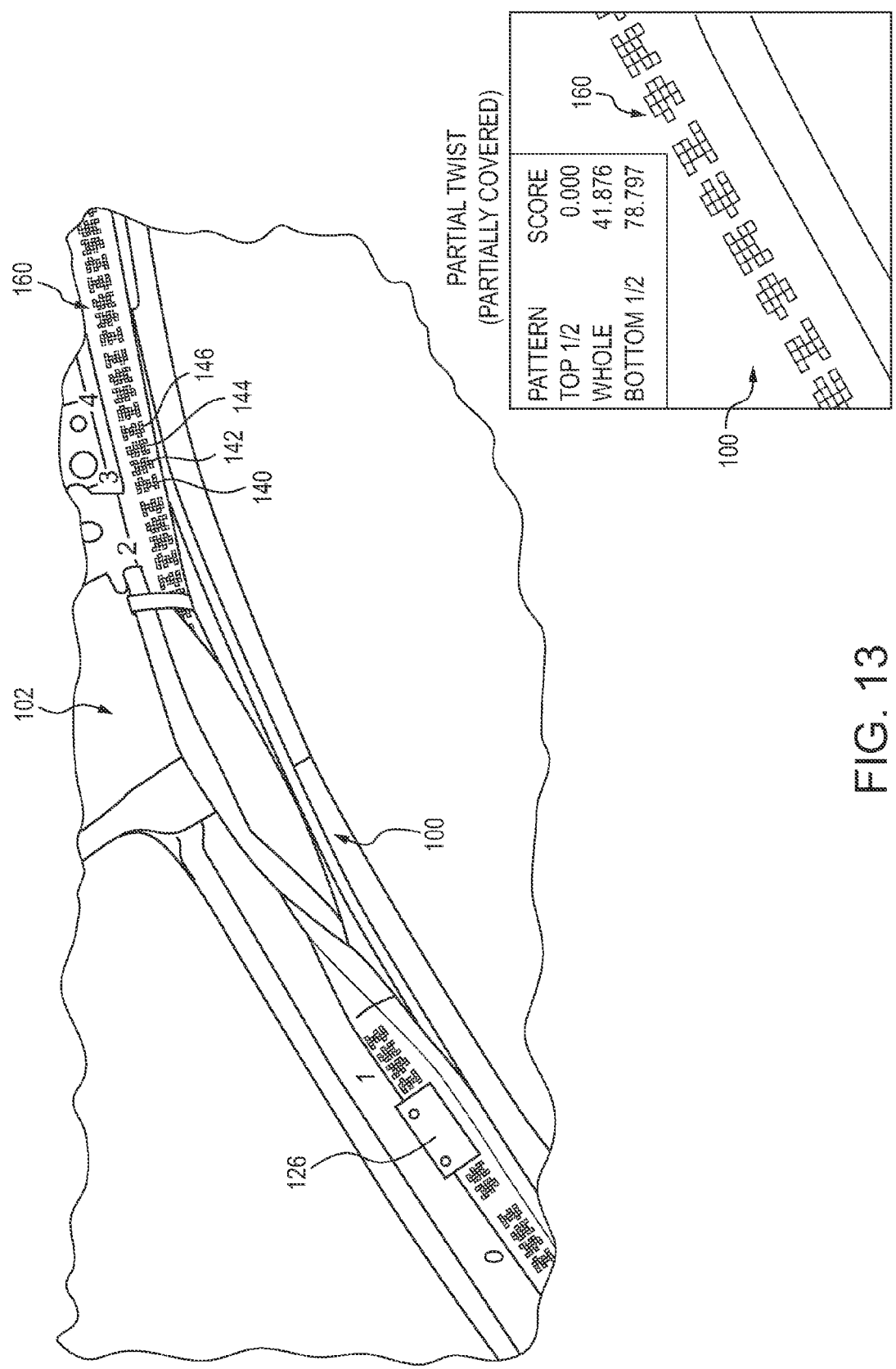

The vehicle can then be moved to a judgment station. The digital images are then sent to a controller 230. The controller 230 may take the form of any processing unit, such as a computer processing unit internal or external to the detectors 220. Further, the controller 230 may be a single processing unit, or may take the form of multiple processing units. The controller 230 processes the images through imaging processing software that has been programmed to look for the markings 160 as described above and to access the installed condition of the cushion 110 or sleeve 112 by comparison of the digital image 222, 224, 226, 228 to master images of the markings 160. The features of the indicia 140, 142, 144, 146 which define each marking 160 being judged are selectively programmed for confirmation. To reduce the amount of pixels 170 being compared which thereby reducing the processing time, the software is programmed to pixelate the perimeter each indicium and compare the pixilated perimeters between the two captured images and master images. This comparison limits misinterpretation of a properly installed side cushion airbag assembly 100 due to the variations possible due to the flexible nature of the cushion 110. By way of example only, the pixels 170 of each of the markings 160 can be defined by 2×2 mm squares, and in the inspection system 150, these 2×2 mm squares become 5×5 mm pixels in a photographic bitmap. The distance between markings 160 can also be measured and compared to known limits. The markings 160 can also be counted by the inspection system 150. Particularly, the sleeve 112 being of known length will have a known count of marking repetitions over its length, and the count of repetitions can be verified. A twisted cushion 110 or sleeve 112 would fail this count confirmation. The layers of judgment when combined ensure proper judgment of the installed condition of the cushion 110 without numerous false detections causing production interruptions. FIGS. 12 and 13 show inspection and judgment of the side curtain airbag assembly 100 by the automated inspection system 150.

Thus, the present disclosure improves the accuracy of automated inspection of side curtain airbag assemblies by utilizing the unique markings 160 on the cushion 110 or sleeve 112. The indicia 140, 142, 144, 146 that make-up each marking 160 can have long perimeters which increase the pixel counts of the perimeters of the indicia and thereby increase the effective resolution of the judgment scale being scored in the imaging processing software of the inspection system 150. For example, the unique shape of indicium 140 has thirty (30) edges that are defined by the pixels 170. By comparison, a simple square shaped indicium of the same size would only have twenty (20) edges, thus an increase of 50%. The indicia 140, 142, 144, 146 can have box-like features that make determining orientation clear. The indicia 140, 142, 144, 146 are also designed such that no left, right, top or bottom edge duplicates the left, right, top or bottom edge of another indicium which prevents the features of one indicium being misinterpreted as the edge of another indicium. The indicia 140, 142, 144, 146 are grouped into sets, e.g., set of four, making the short word or marking 160 which, when repeated along the length of the cushion 110 or sleeve 112 of the side cushion airbag assembly 100, allows the image processing software to find the marking 160, determine its orientation and judge its completeness in reference to a master image of the same indicia set. A shorter marking increases the match of the marking as the cushion 110 follows a curved path.

The indicia 140, 142, 144, 146 also have unique upper portions 180, 182, 184, 186 and lower portions 190, 192, 194, 196 that can be taught as recognizable markings independent of and in addition to the complete marking. In doing so, if part of the marking 160 is covered or not visible due a distortion in a portion of the side curtain airbag assembly 100, as long as a predetermined percentage of the upper portions or lower portions of the marking 160 can still be detected, a successful judgment can be made by the inspection system 150. In other words, if part of the marking 160 is visible, the inspection system 150 can successfully judge twist and not falsely indicate a twisted condition. Furthermore, the markings 160, the spacing between adjacent markings and the spacing between adjacent indicium of each marking 160 are of known dimensions and thus the image processing software can measure the distance between markings. By doing so, a cushion 110 or sleeve 112 in a twisted state would remove several repetitions of the marking 160 from the image and be judged as twisted. Likewise, if one of the markings 160 is covered by device such as a bracket 126 that produces a spacing between markings greater than the known spacing between adjacent markings yet smaller than a gap typical of a twisted condition, the image can be judged correctly as not twisted. The design of the indicia 140, 142, 144, 146 is such that when the marking 160 is flipped 180 degrees, the same marking appearance exists. This feature allows more flexibly in manufacturing of the side cushion airbag assembly 100. The repeating markings 160 run the length of the cushion 110 or sleeve 112 and thus appear much like a stripe which is easily discernible by the human eye. The colors of the indicia can be unique to each side cushion airbag part type, thus further enhancing the easy judgment of the human eye.

The inspection system 150 can determine a match percentage of the pixels defining the edge of the inspected indicia 140, 142, 144, 146 and/or of the pixels within the area inscribed by the edges of the inspected indicia 140, 142, 144, 146 as compared to the same pixels of the master image. It should be appreciated that with edge detection, the number of pixels involved is much less than the number of pixels involved if the areas within the edges is used, and the number of pixels involved can directly affect processing time. However, edge detection and/or area comparison can be implemented by the controller 150 for determining if the cushion 110 or sleeve 112 is in a twisted state or non-twisted state.

According to one aspect, a method of accessing an installed condition of a side curtain airbag assembly (i.e., a vehicle part) comprises providing a plurality of spaced markings 160 along a length of a cushion 110 or sleeve 112 of the side curtain airbag assembly 100; defining each marking 160 by at least two indicia including a first indicium and a second indicium having a shape differing from a shape of the first indicium, each of the first indicium and second indicium being formed from a plurality of similarly shaped and sized interconnected pixels 170; capturing images with a detector 220 of the first and second indicia of the plurality of markings 160; and comparing the captured images of the first and second indicia of the plurality of markings 160 with master images of the first and second indicia of the plurality of markings 160 with a controller 230 in communication with the detector 220 to determine presence of each of the plurality of markings 160. The method further includes detecting edges of the plurality of pixels 170, and determining a match percentage of the pixels 170 defining the edges of the first and second indicia or of the pixels within an area inscribed by the edges of the first and second indicia as compared to the same pixels of the master images.

Figure 17:
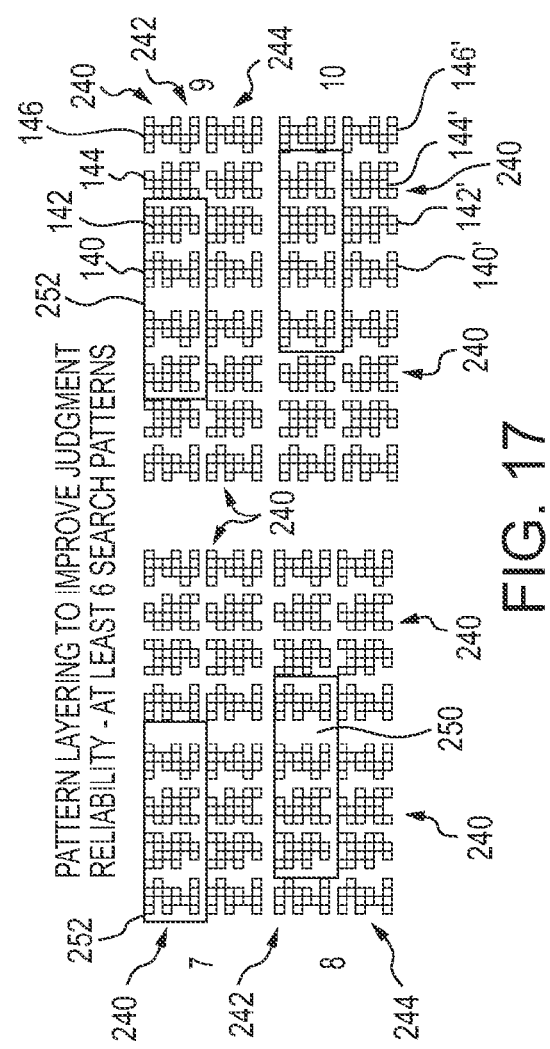
FIG. 17 depicts the plurality of markings of FIG. 15 with further patterns for detection provided by adjacent markings.

FIGS. 15 and 17 depict another embodiment of a plurality of markings 240 according to the present disclosure that can be arrayed in a repeating manner along the longitudinal direction of the cushion or sleeve of the side curtain airbag assembly 100. Again, the markings 240 enable the automated vision inspection system 150 (see FIG. 11) to quickly determine the state of the installed cushion 110 of the side curtain airbag assembly 100. According to this aspect, each marking 240 is defined by a pair of stacked indicia, and each indicium of the pair of stacked indicia defined by a plurality of polygonal shaped pixels having features similar to pixels 170 described above. Particularly, each marking 240 is defined by a first set/row of indicia 242 and a second set/row of indicia 244 located immediately beneath the first set of indicia 242. The first row of indicia 242 can be defined by a first indicium, a second indicium located adjacent the first indicium, a third indicium located adjacent the second indicium and a fourth indicium located adjacent the third indicium, each indicium having a differing shape and being formed from a plurality of similarly shaped and sized interconnected pixels (again having features similar to pixels 170). The third indicium can be an ambigram of the second indicium and the fourth indicium can be an ambigram of the first indicium.

More particularly, the first row of indicia 242 can be defined by the exemplary characters or indicia 140, 142, 144, 146. As such, the first indicium is indicium 140, the second indicium is indicium 142, the third indicium is indicium 144 and the fourth indicium is indicium 146. The second set of indicia 244 is defined by indicia of similar shape and size as the indicia (e.g., indicia 140, 142, 144, 146) of the first set of indicia 242. According to one embodiment, the indicia of the second set of indicia 244 are identical to the first row of indicia 242, and for ease of understanding, the indicia of the second set will be identified with an apostrophe (') (e.g., indicia 140', 142', 144', 146'). Therefore, indicium 140' is located immediately below indicium 140, indicium 142' is located immediately below indicium 142, indicium 144' is located immediately below indicium 144, and indicium 146' is located immediately below indicium 146. Because the details of the indicia 140, 142, 144, 146 were described above, further description will be omitted for conciseness.

It should be appreciated that by correctly positioning the exemplary markings 240 on the cushion or sleeve, additional patterns associated with each marking 240 are created and reliability of the detection of the markings 240 by the automated vision inspection system 150 can increase. For example, and as best illustrated in FIG. 15, a defined area 250 within each depicted indicia box 252 is a pattern provided by a master image of each marking 240 that can be used by the controller 230 in its analysis of the captured images of the detectors 220. The area 250 of the indicia box 252 receives one of the first row of indicia 242, the second row of indicia 244, and a portion of each of the first row and second row of indicia of the marking. As will be described below, the indicia box 252 provides for secondary markings and the controller 230 is configured to determine presence of the secondary markings on the captured images.

By way of example, each of the first row of indicia 242 and the second row of indicia 244 is defined by respective rows of pixels 170, and the indicia box 252 is movable by at least one row of pixels downward from the first row of indicia 242 to the second row of indicia 244. More particularly, as shown in FIG. 15, pattern (1) of each marking 240 is similar to the marking 160 previously described and can be found in either the upper first set of indicia 242 or the lower second set of indicia 244. As depicted, pattern (1) is found in the first set of indicia 242. Pattern (2) shifts the indicia box 252 downwardly by a row of pixels 170 thereby dropping a top row of pixels 170 of each indicium 140, 142, 144, 146 of the upper first set of indicia 242 and picking up a top row of pixels 170 of each indicium 140', 142', 144', 146' of the lower second set of indicia 244. Pattern (3) shifts the indicia box 252 downwardly by another row of pixels. Patterns (4), (5) and (6) continue the shifting of the indicia box 252 downwardly until the area 250 of the indicia box 252 includes the lowermost row of pixels of each indicium 140, 142, 144, 146 of the upper first set of indicia 242 and excludes the lowermost row of pixels of each indicium 140', 142', 144', 146' of the lower second set of indicia 244.

Figure 16:
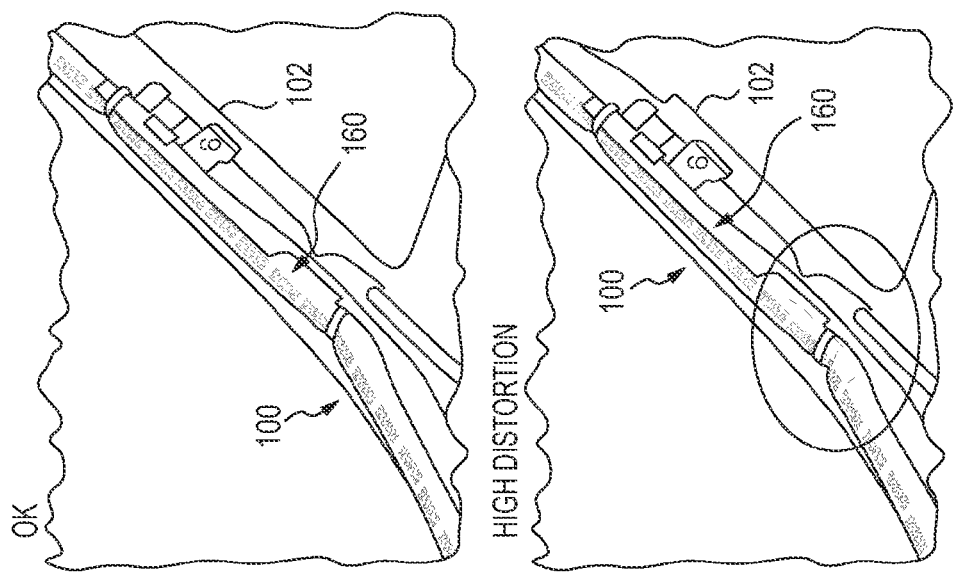
FIG. 16 shows another section an installed side curtain airbag assembly having adequate visibility of the plurality of markings of FIGS. 2-5 and distorted visibility of the plurality of markings of FIGS. 2-5.

Because distortion of the side curtain airbag assembly 100 can also affect the detection of the markings 160 (see FIG. 16), FIG. 17 depicts a further manner of determining the installed state of the side curtain airbag assembly 100. According to this aspect, at least one master image is an image of a first marking and an adjacent second marking of the plurality of markings 240. The master images includes the indicia box 252 having the defined area 250 for receiving one of the first row of indicia 242 of the first marking 240, the second row of indicia 244 of the first marking 240, at least one indicium of the first row of indicia 242 of the first marking 240 and at least one indicium the first row of indicia 242 of the adjacent second marking 240, and at least one indicium of the second row of indicia 244 of the first marking and at least one indicium the second row of indicia 244 of the adjacent second marking. Again, the indicia box 252 provides for secondary markings and the controller 230 is configured to determine presence of the secondary markings on the captured images. Further, the indicia box 252 is movable by at least one indicium from one of the first and second rows of indicia of the first marking to one of the corresponding first and the second rows of indicia of the second marking.

Thus, by use of the exemplary markings 240 on the cushion or sleeve of the assembly 100, the indicia box 252 provided on the master images having the markings 240 can be shifted to include at least one indicium of an adjacent marking 240. This, in turn, provides further patterns associated with captured images of the markings 240 that can be analyzed by the automated vision inspection system 150. By way of example, and with reference to FIG. 17, the indicia box 252 can be shifted to the right so that the area 250 of the indicia box 252 removes at least one indicium of one of the first and second sets of indicia 242, 244. Pattern (7) is the same as pattern (1) shown in FIG. 15. Pattern (8) drops indicium 140 of the first set of indicia 242 of one marking 240 and adds indicium 140 of the first set of indicia 242 of the adjacent marking 240. Pattern (9) and pattern (10) repeat this shift of the indicia box 252. Therefore, according to this aspect of the present disclosure, the images of the markings 240 provided on the side curtain airbag assembly 100 that can be used to determine the installed state of the assembly 100 are at least patterns (1) through (10), the respective upper portions 180, 182, 184, 186 of the indicia 140, 142, 144, 146 of the first set of indicia 242 of pattern (1) and the respective lower portions 190, 192, 194, 196 of the indicia 140, 142, 144, 146 of the first set of indicia 242 of pattern (1). The vision system 150 is configured to simultaneously detect these patterns in a manner similar to the detection of the markings 160 described above and once detected, the corresponding section of the cushion 110 or the sleeve 112 would be deemed "Present" or "Not Twisted" and provided the sequence of passes was continuous from one end of the side curtain airbag assembly 100 to the other, the side curtain airbag assembly 100 installation as a whole would be judged as "Pass".

Figure 18:
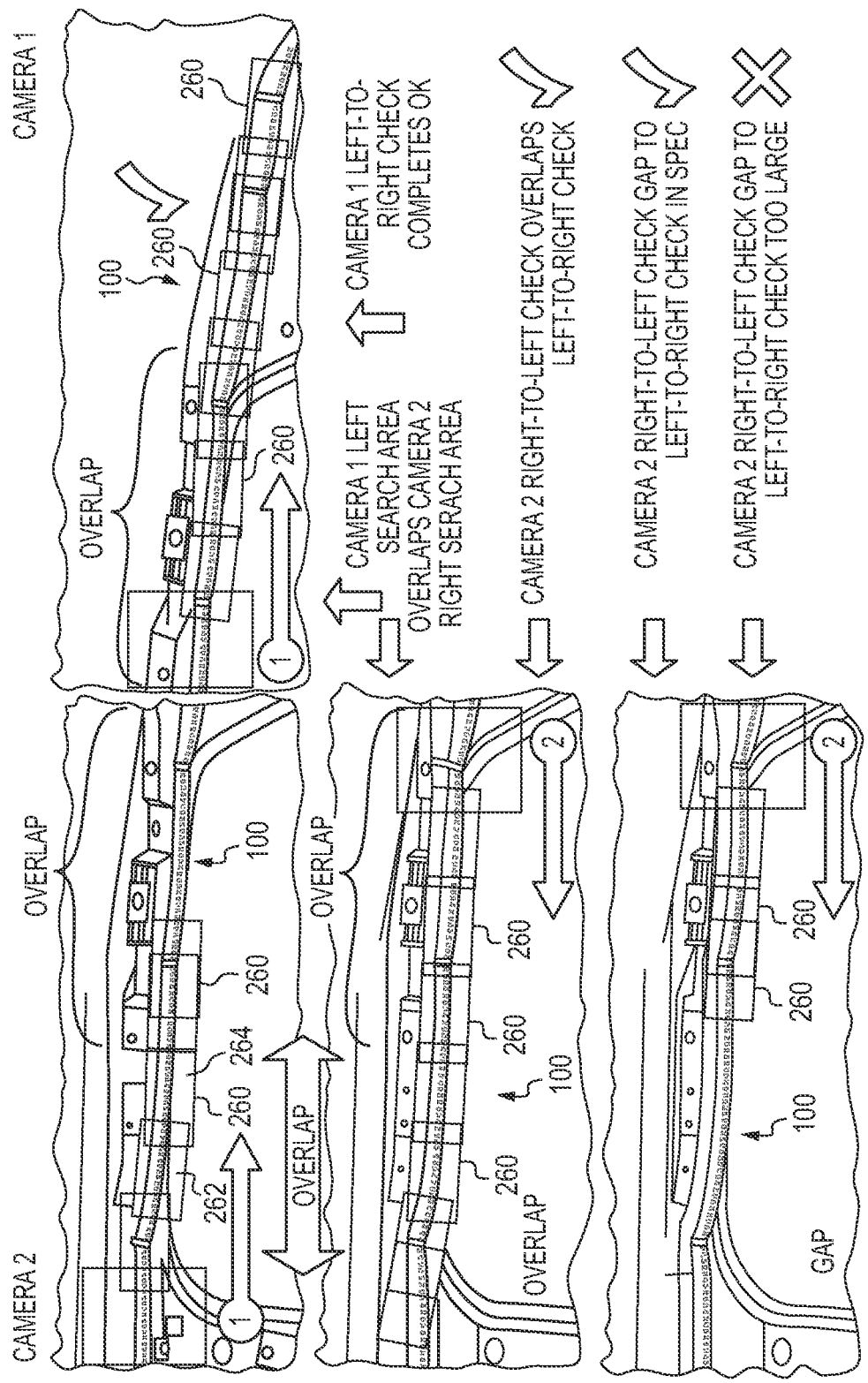
FIG. 18 depicts one operation of the exemplary automated vision inspection system of FIG. 11 for detecting the markings of FIGS. 2-5 or FIGS. 15 and 17 provided on the side curtain airbag assembly and determining the installed state of the side curtain airbag assembly.

FIG. 18 depicts one operation of the exemplary automated vision inspection system 150 for detecting the markings 160 and determining the installed state of the side curtain airbag assembly 100. Although the markings 160 are depicted on the assembly 100, it should be appreciated that the below described operation of the vision system 150 can be used for detecting the markings 240. As indicated previously, and as shown in FIG. 11, the automated vision inspection system includes the detectors 220 (e.g., digital cameras) configured to capture digital images of the plurality of markings 160, 240 and the controller 230 configured to process the digital images captured by the detectors 220 and to determine presence of the indicia of the plurality of markings 160, 240 (in a manner similar to that described above) to access an installed condition of the cushion 110 or sleeve 112 by comparison of the digital images to master images.

In order to inspect the entire length of the side curtain airbag assembly 100, several overlapping images 260 of the markings 160 captured by the detectors 220 are required. Within each image 260, the controller 230 of the automated vision inspection system 150 is configured to start with a search region 262 on one side of the assembly 100 (i.e., the left side in the depicted images 260). Within the original search region 262, if the marking 160 is detected, the vision system 150 uses the position of a center of the detected marking 160 and the orientation of the detected marking 160 to forecast where the next two markings 160 along the length of the cushion 110 or sleeve 112 should occur. A new search region 264 is placed around that forecasted position and the controller 230 is configured to search for the next marking 160. This process of providing overlapping search regions and detecting of markings 160 within the search regions continues along the length of the side curtain airbag assembly 100. According to one aspect of the vision system 150, if a last search region is not near an edge (e.g., the right edge) of the assembly 100, the controller 230 is configured to commence a similar search from the opposite side of the assembly 100 (i.e., the right side in the depicted images 260). If the position of, for example, the right-most occurrence of the first search and, for example, the left-most occurrence of the second search is within a prescribed distance, the section of the side curtain airbag assembly 100 within the images 260 is judged as being not twisted and a decision of "Pass" results. If the distance between these occurrences is larger than the prescribed distance, the section within the images 260 is judged as potentially being twisted and the decision of "Fail" results. If all the images of the entire side curtain airbag assembly result in a "Pass", the assembly 100 is judged as a "Pass"" (i.e., the side curtain airbag assembly 100 is in a non-twisted state), and according to one embodiment, if one image of the assembly 100 is judged "Fail" the side curtain airbag assembly is judged as "Fail"" (i.e., the side curtain airbag assembly 100 is in a twisted state). By way of example, for a smaller sized vehicle, two to three images of side curtain airbag assembly 100 may be sufficient to properly judge the installed state of the assembly, and for a larger vehicle or SUVs, four to five images of the side curtain airbag assembly 100 may be required.

FIGS. 19 and 20 depict another operation of the exemplary automated vision inspection system 150 for detecting the markings 160 provided on the side curtain airbag assembly 100 and determining the installed state of the side curtain airbag assembly. Again, although the markings 160 are depicted on the assembly 100, it should be appreciated that the below described operation of the vision system 150 can be used for detecting the markings 240. According to this aspect, at least one zone marker is provided on one end of the cushion or the sleeve. Then at least one zone marker separates the side cushion airbag assembly 100 into at least two zones, each zone having at least one marking of the plurality of markings 160. The detector 220 is configured to capture digital images of the at least one marking in each zone, and the controller 230 is configured to access an installed condition of each zone of the cushion or sleeve by comparison of the digital images to the master images.

More particularly, the side curtain airbag assembly 100 is divided into zones (e.g., the depicted zones 270, 272, 274, 276). By dividing the side curtain airbag assembly 100 into zones, the detectors 220 can capture images of each zone and the controller 230 can then analyze the captured images by comparison with the master images. According to one aspect, if all the zones pass, the side curtain airbag assembly 100 is judged "Pass" (i.e., the side curtain airbag assembly 100 is in a non-twisted state). In this way, clearer traceability can be established by the automated vision inspection system 150. Further, each vehicle VIN number can have retained with its pedigree, a zone-by-zone judgment of the side curtain airbag assembly 100 installed condition.

To properly identify the separate zones 270, 272, 274, 276 (FIG. 20), exemplary zone markers 280A-280E are provided (FIG. 21), with one zone marker (e.g., zone marker 280A) being located at a front of the installed assembly 100 (i.e., front of the vehicle) and another zone marker (e.g., zone marker 280E) being located at the rear of the assembly 100 (i.e., the rear of the vehicle). Each zone marker is defined by at least one indicium having a shape different than a shape of each indicium of the first and second rows of indicia 242, 244. Each zone marker 280A-280E is defined by a first indicium, a second indicium located adjacent to the first indicium and a third indicium located adjacent to the first indicium, each indicium having a differing shape. The third indicium can be an ambigram of the first indicium.

By way of example, as depicted in FIG. 21, each of the zone markers 280 is provided with at least one character or indicium of a plurality of exemplary characters or indicia 290, 292, 294, 296, 298, 300 designed to improve the accuracy of the automated inspection of the side curtain airbag assembly. The indicia 290, 292, 294, 296, 298, 300 enable the automated vision inspection system 150 (FIG. 11) to quickly detect the respective zones 280 of the installed side curtain airbag assembly 100. According to one embodiment, each zone marker 280 includes three indicia selected from the plurality of indicia 290, 292, 294, 296, 298, 300, with the third indicium being an ambigram of the first indicium. Similar to the indicia of the markings 160, 240, each indicium 290, 292, 294, 296, 298, 300 of the zone markers 280 can be formed from a plurality of similarly shaped and sized interconnected pixels 302 which together provide for indicium having a predetermined height and width, and a predetermined spacing between adjacent indicium of each zone marker 280. Particularly, and according to one aspect, each pixel 302 can be a 2 mm by 2 mm square, with the height of each indicium 290, 292, 294, 296, 298, 300 of about 8 mm (i.e., 4 2×2 mm pixels), a width of each indicium 290, 292, 294, 296, 298, 300 of about 6 mm (i.e., 3 2×2 mm pixels), and the spacing between adjacent indicium of each zone marker 280 of about 2 mm. With the use of the pixels, the vision system 150 can detect the zone markers 280 in a manner similar to the detection of the markings 160, 240 described above. Alternatively, according to another aspect, each indicium 290, 292, 294, 296, 298, 300 of the zone markers 280 can be defined by a single pixel having a predetermined shape, with the vision system 150 configured to detect the shape of each indicium.

As should be appreciated, the exemplary automated vision inspection system 150 can be programmed in a similar manner for all vehicle lines. Each detector 220 of the vision system 150 would capture digital images of the installed side curtain airbag assembly 100 as previously disclosed. The controller 230 of the vision system 150 is configured to analyze the captured digital images and identify/locate the zone markers 280A and 280B (FIG. 20). The controller 230 is then configured to determine presence of the indicia of the markings 160, 240 (in a manner similar that described above) provided between those zone markers and render a judgment as to the installed state of that section of the assembly 100. This process can continue for the adjacent zones 272, 274 and 276 until zone marker 280E is located. Zone marker 280E identifies to the vision system 150 the end of the installed side curtain airbag assembly 100. According to one aspect, if all zones pass, the assembly 100 is judged as "Pass" (i.e., the side curtain airbag assembly 100 is in a non-twisted state). If one of the zones fails, the assembly 100 is judged as "Fail"" (i.e., the side curtain airbag assembly 100 is in a twisted state). It should be appreciated that small vehicle may require fewer zones (e.g., three zones identified by zone markers 280A-280B, 280B-280C, 280C-280E), and larger vehicles or SUVs may require more zones (e.g., five zones identified by zone markers 280A-280B, 280B-280C, 280C-280D, 280D-280F, 280E-280). One benefit of this approach is the overlap of inspection between images can be eliminated and the vision system 150 is able to determine for itself where the assembly 100 begins and ends.

Figure 22:
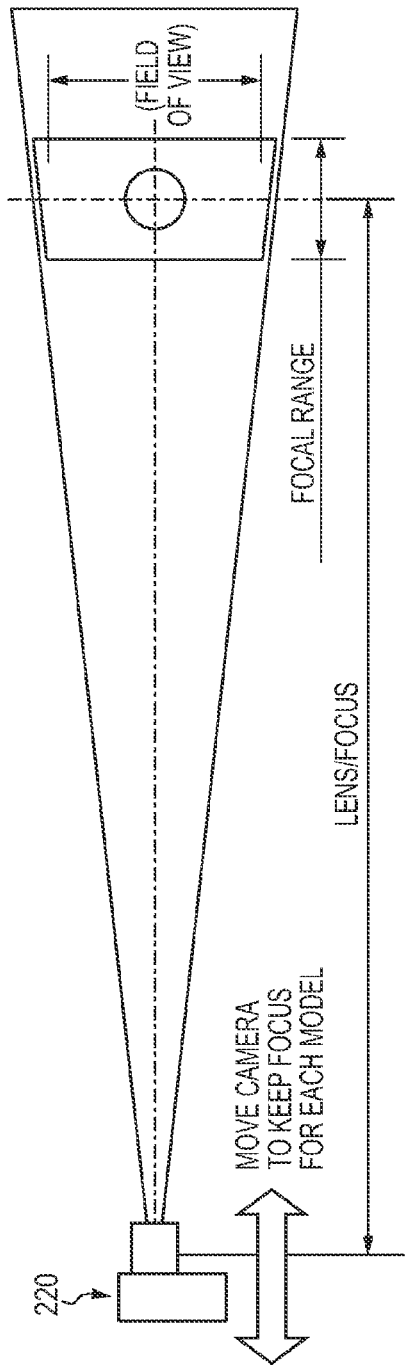
FIG. 22 schematically shows a focus, field of view and focal range of one of the detectors of the automated vision inspection system of FIG. 11.
Figure 23:
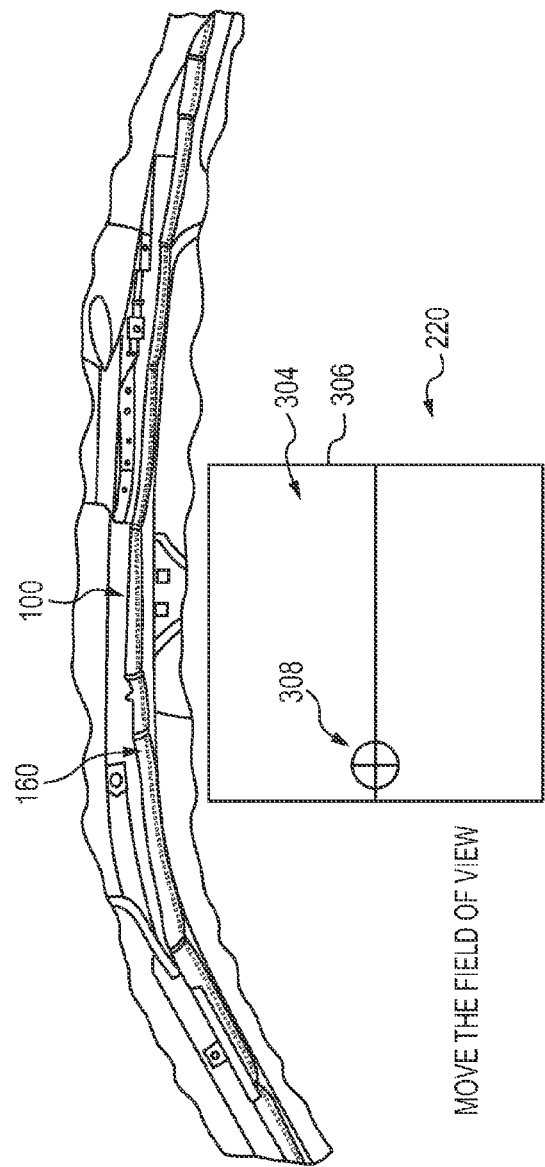
FIGS. 23-25 show the field of display of one of the detectors of the vision system being aligned on sections of the installed side curtain airbag assembly.
Figure 24:
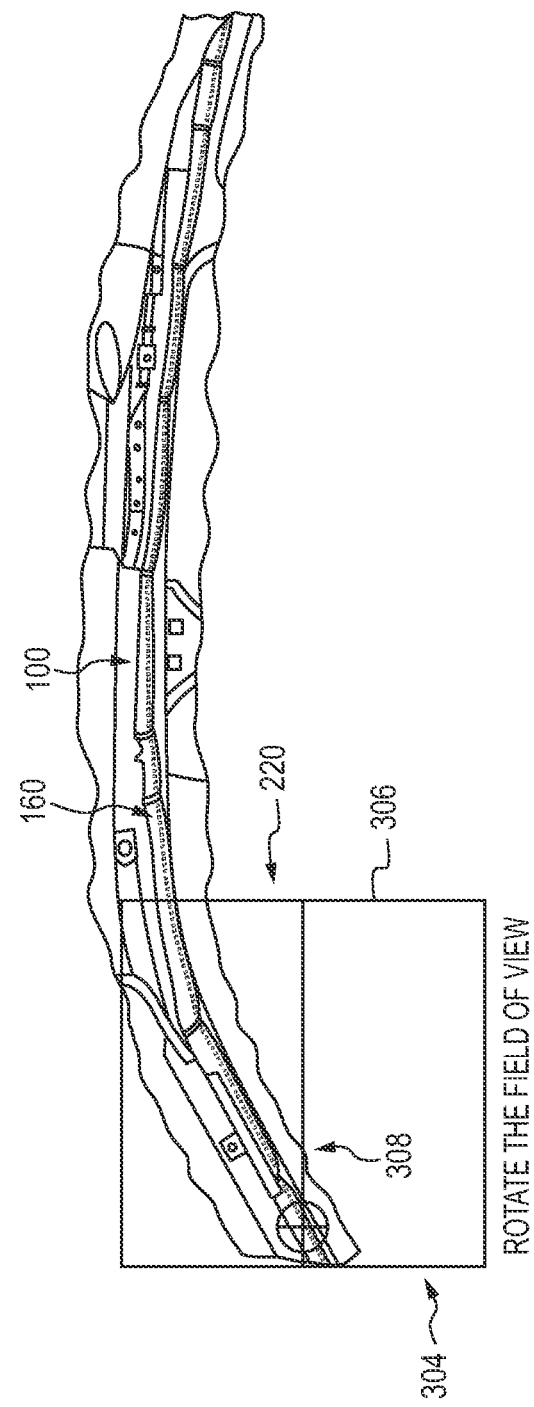
Figure 25:
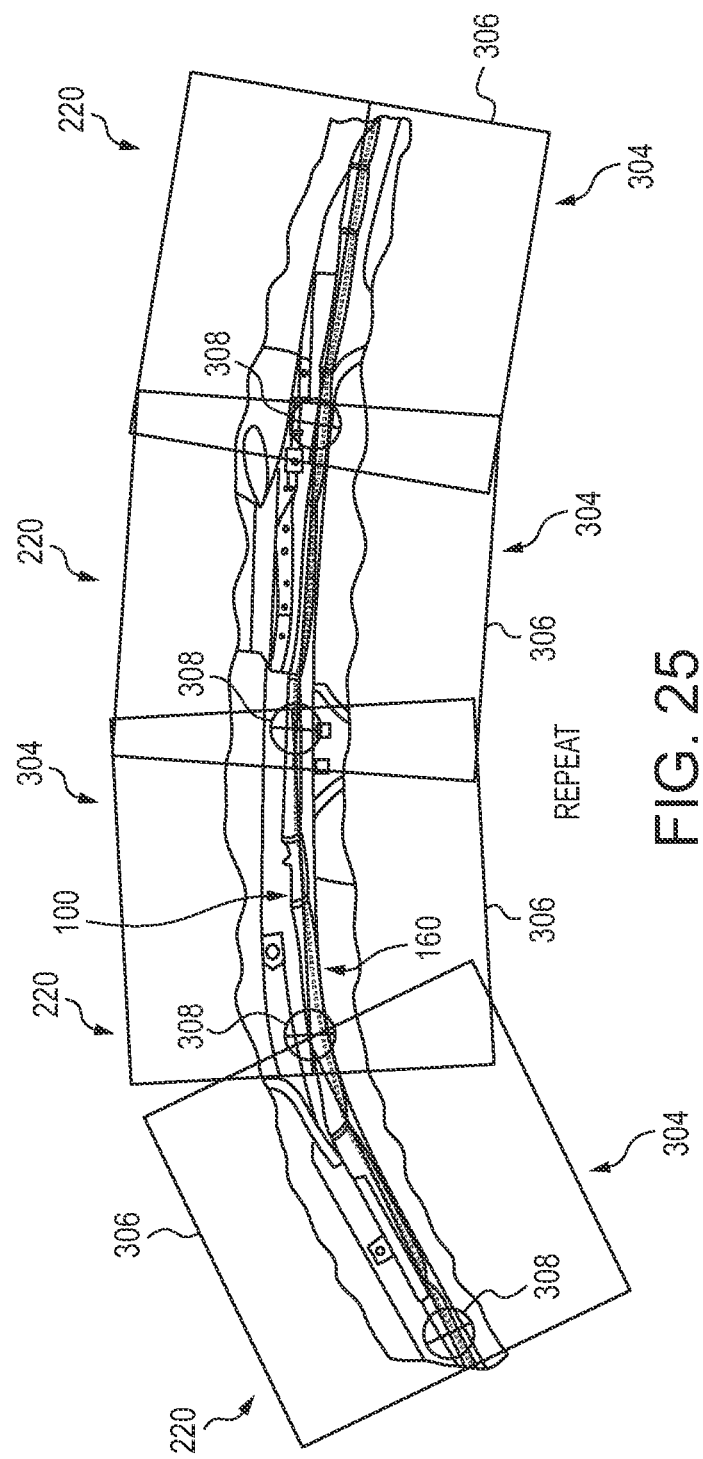
Figure 28:
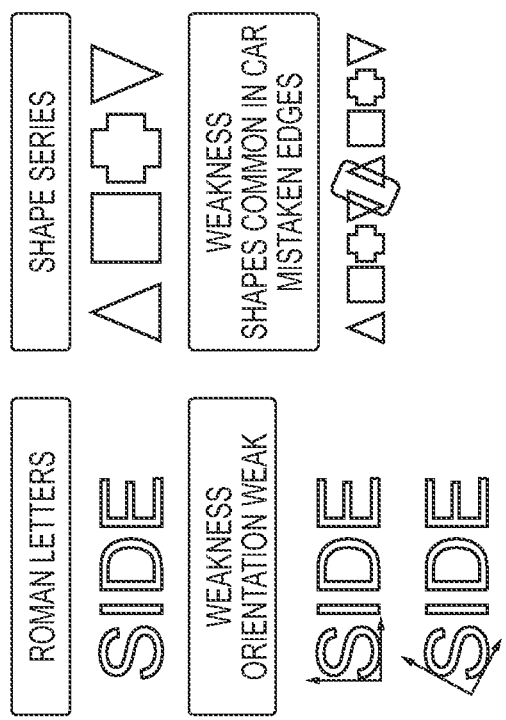
FIG. 28 depicts the weaknesses of using Roman letters or geometric shapes as indicium in a marking system.

With reference now to FIG. 22, each of the detectors 220 of the exemplary automated vision inspection system 150 can have a fixed focus (e.g., 3000 mm for a 50 mm lens) and a field of view (e.g., 1000 mm) and a focal range of sufficient focus (e.g., 100 mm) for the capturing of the digital images of the side curtain airbag assembly 100. FIGS. 23-25 depict the field of view 304 of one of the detectors 220 of the vision system 150. While looking at the field of view 304 of the detector 220 on a connected display 306, the field of view can be moved such that a target 308 is positioned on one end (e.g. the left end) of the side curtain airbag assembly 100. The field of view 304 can then be rotated to align a part of the target 308 (i.e., the depicted elongated line of the target) such that an end of that part of the target 308 is approximately on a center of the side curtain airbag assembly 100. This level of alignment is sufficient for the vision software 150 to find the exemplary markings 160, 240. At this aligned position, the aligned detector 220 would to capture a digital image. The field of view 304 of the detectors 220 is moved along the length of the assembly 100 and is aligned at predetermined positions to capture further digital images assembly 100. This positioning process is repeated along the length of the side curtain airbag assembly 100 making sure images of the markings 160, 240 are captured at each predetermined position. Further, if the above described zone markers 280A-280E are used, each captured image should include two zone markers. If the zone markers are not used, each captured image should overlap the adjacent images.

A robot 310 can position the detector 220 into focus with a simple measurement check between the detector and the assembly 100. As shown in FIG. 27, to further improve the reliability of the vision system 150, the robot 310 can be configured to have a pair of detectors 220 mounted to an end portion of a moveable arm 312. One of the detectors would be used for all alignment and programming and the other one of the detectors would be aimed such that its field of view coincides with that of the other detector at the focal distance. According to one embodiment, both detectors 220 can be configured to simultaneously capture digital images of the same section of the assembly 100, and the controller 230 can be configured to render simultaneous independent judgment as to the installed state of that section according to the respective captured images. Further, and as illustrated in FIG. 26, in an instance where the controller 230 would judge a section of the assembly 100 as "Fail" based on captured images of one of the detectors 220 and would also judge the same section as "Pass" based on the captured images of the other detector 220, the judgment of "Pass" would supersede the judgment of "Fail" and the side curtain airbag assembly 100 would be judged as "Pass" (i.e., the side curtain airbag assembly 100 is in a non-twisted state).

As is evident from the foregoing, the present disclosure provides a part for installation on an associated body comprising a part body including a plurality of spaced markings 160, 240 arrayed along a longitudinal extent of the part body. Each marking is defined by at least two indicia including a first indicium and a second indicium (e.g., indicia 140, 142). The first indicium is uniquely shaped compared to a shape of the second indicium. Each of the first indicium and second indicium is formed from a plurality of similarly shaped and sized interconnected polygonal shaped pixels 170. The plurality of markings 160, 240 allow for determination of an installed state of the part. Each marking of the plurality of markings can be further defined by a third indicium (e.g., indicium 144) located adjacent the second indicium and a fourth indicium (e.g., indicium 146) located adjacent the third indicium, each indicium having a differing shape. According to one aspect, the third indicium is an ambigram of the second indicium and the fourth indicium is an ambigram of the first indicium. Each marking 240 is defined by the first upper row of indicia 242 and the second lower row of indicia 244, each of the first row of indicia and the second row of indicia including the first indicium and the second indicium. At least one zone marker 280 can be provided on the part body. The zone marker 280 separates the part body into at least two zones and is defined by at least one indicium having a shape different than the shape of each indicium of the markings 160, 240.

More particularly, a vehicle part, such as the side curtain airbag assembly 100, for installation on a vehicle body comprises a part body including a plurality of spaced markings 240 arrayed along its respective longitudinal extent. Each marking 240 is defined by a first upper row of indicia 242 and a second lower row of indicia 244. Each of indicium of the first row of indicia 242 is uniquely shaped compared to a shape of the other indicia provided in the first row of indicia 242. The first row and second row of indicia 242, 244 are formed from a plurality of similarly shaped and sized interconnected pixels 170. The plurality of markings 240 allows for determination of an installed state of the vehicle part. According to one aspect, the second row of indicia 244 is identical to the first row of indicia 242. At least one zone marker 280 can be provided on the part body. The at least one zone marker separates the part body into at least two zones. The zone marker 280 defined by at least one indicium having a shape different than a shape of each indicium of the first row and second row of indicia 242, 244.

According to one embodiment, a method of accessing an installed condition of a vehicle part (e.g., the side curtain airbag assembly 100) on a vehicle body comprises providing a vehicle part having a plurality of spaced marking 240 along a length the vehicle part; defining each marking 240 by a first upper row of indicia 242 and a second lower row of indicia 244, each indicium of the first row of indicia 242 and the second row of indicia 244 being formed from a plurality of similarly shaped and sized interconnected pixels 170; capturing images with a detector 220 of the plurality of markings 240; and comparing the captured images of the plurality of marking with master images with a controller 230 in communication with the detector 240 to determine presence of the plurality of markings 240 along the length of the vehicle part. The method further includes separating the vehicle part (e.g., the side curtain airbag assembly 100) into at least two zones 270, 272, 274, 276, each zone having at least one marking 280A-280E; capturing images of each zone with the detector 220; comparing the captured images of each zone with the master images with the controller 230, and accessing an installed condition of each zone to determine the installed condition of the vehicle part. The method further includes detecting edges of the plurality of pixels 170, and determining a match percentage of the pixels defining the edges of the indicia of the first row of indicia 242 and/or the second row of indicia 244 or of the pixels within an area inscribed by the edges of the indicia of the first row of indicia 242 and/or the second row of indicia 244 as compared to the same pixels of the master images.

It should be appreciated that the markings 160, 240 can be defined by any number of indicium, whatever is suitable for a particular application. By way of example, for the side curtain airbag assembly 100, each marking is relatively short (i.e., marking 160 being defined by four indicium and marking 240 being defined by upper and lower rows of indicia 242, 244, each row having four indicium) to allow the automated vision inspection system 150 to follow the curved path of the installed assembly. However, for less curved assemblies, a part can be provided with markings defined by more than four indicia, which can decrease the number of markings arrayed along the part.

It will also be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by this disclosure.

What is claimed is:

1. An automated vision inspection system for detecting whether a cushion of a side curtain airbag assembly system is in a properly installed or twisted state, the system comprising:
   a plurality of markings arrayed along a longitudinal extent of one of a cushion or a sleeve covering the cushion of a side cushion airbag assembly, each marking being defined by a pair of stacked indicia, each indicium of the pair of stacked indicia defined by a plurality of polygonal shaped pixels;
   a detector configured to capture digital images of the plurality of markings; and
   a controller configured to process the digital images captured by the detector and to determine presence of the indicia of the plurality of markings to assess an installed condition of the cushion or sleeve by comparison of the digital images to master images.

2. The system of claim 1, wherein each of an upper indicium and a lower indicium of the pair of stacked indicia of each marking is formed from a plurality of similarly shaped and sized interconnected pixels having non-intermeshing edges.

3. The system of claim 1, wherein each marking of the plurality of markings is defined by a first upper row of indicia and a second lower row of indicia.

4. The system of claim 3, wherein the first row of indicia is defined by a first indicium, a second indicium located adjacent the first indicium, a third indicium located adjacent the second indicium and a fourth indicium located adjacent the third indicium, each indicium having a differing shape and being formed from a plurality of similarly shaped and sized interconnected pixels, wherein the second row of indicia is identical to the first row of indicia.

5. The system of claim 4, wherein the third indicium is an ambigram of the second indicium and the fourth indicium is an ambigram of the first indicium.

6. The system of claim 4, wherein the controller is configured to detect edges of each marking to determine the orientation of the marking on the sleeve or cushion, and wherein the plurality of pixels defining each indicium have non-intermeshing edges, the controller configured to detect the non-intermeshing edges of the plurality of pixels.

7. The system of claim 6, wherein the controller is configured to determine a match percentage of the pixels defining the edges of each indicium or of the pixels within the area inscribed by the edges of the indicia as compared to the same pixels of the master images, and the controller is configured to pixelate a perimeter of each indicium to generate pixelated perimeters and compare the pixelated perimeters with the master images.

8. The system of claim 6, wherein at least one master image is an image of one of the markings and includes an indicia box having a defined area for receiving one of the first row of indicia, the second row of indicia, and a portion of each of the first row and second row of indicia of the marking, the indicia box providing for secondary markings and the controller being configured to determine presence of the secondary markings on the captured images.

9. The system of claim 8, wherein each of the first row of indicia and the second row of indicia is defined by respective rows of pixels, and the indicia box is movable by at least one row of pixels downward from the first row of indicia to the second row of indicia.

10. The system of claim 6, wherein at least one master image is an image of a first marking and an adjacent second marking of the plurality of markings, and the master images includes an indicia box having a defined area for receiving one of the first row of indicia of the first marking, the second row of indicia of the first marking, at least one indicium of the first row of indicia of the first marking and at least one indicium the first row of indicia of the second marking, and at least one indicium of the second row of indicia of the first marking and at least one indicium the second row of indicia of the second marking, the indicia box providing for secondary markings and the controller being configured to determine presence of the secondary markings on the captured images.

11. The system of claim 10, wherein the indicia box is movable by at least one indicium from one of the first and second rows of indicia of the first marking to one of the corresponding first and the second rows of indicia of the second marking.

12. The system of claim 1, further including at least one zone marker provided on one of the cushion or the sleeve, the at least one zone marker separating the side cushion airbag assembly into at least two zones, each zone at least one marking of the plurality of markings, the detector configured to capture digital images of the at least one marking in each zone, the controller configured to access an installed condition of each zone of the cushion or sleeve by comparison of the digital images to the master images.

13. The system of claim 12, wherein the zone marker is defined by at least one indicium having a shape different than a shape of each indicium of the pair of stacked indicia.

14. The system of claim 13, wherein, the zone marker is defined by a first indicium, a second indicium located adjacent to the first indicium and a third indicium located adjacent to the first indicium, each indicium having a differing shape.

15. The system of claim 14, wherein the third indicium is an ambigram of the first indicium.

* * * * *